(12) United States Patent
Troy et al.

(10) Patent No.: US 10,634,632 B2
(45) Date of Patent: Apr. 28, 2020

(54) METHODS FOR INSPECTING STRUCTURES HAVING NON-PLANAR SURFACES USING LOCATION ALIGNMENT FEEDBACK

(71) Applicant: The Boeing Company, Chicago, IL (US)

(72) Inventors: James J. Troy, Issaquah, WA (US); Scott W. Lea, Renton, WA (US); Gary E. Georgeson, Renton, WA (US); Daniel James Wright, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 239 days.

(21) Appl. No.: 15/962,832

(22) Filed: Apr. 25, 2018

(65) Prior Publication Data

US 2019/0331620 A1    Oct. 31, 2019

(51) Int. Cl.
| | | |
|---|---|---|
| *G01B 5/28* | (2006.01) | |
| *G01N 25/72* | (2006.01) | |
| *G01J 5/10* | (2006.01) | |
| *G01J 5/02* | (2006.01) | |
| *G01S 17/08* | (2006.01) | |
| *G01J 5/00* | (2006.01) | |
| *G01N 25/18* | (2006.01) | |

(52) U.S. Cl.
CPC ............ *G01N 25/72* (2013.01); *G01J 5/0275* (2013.01); *G01J 5/10* (2013.01); *G01S 17/08* (2013.01); *G01J 2005/0077* (2013.01); *G01J 2005/0081* (2013.01); *G01N 25/18* (2013.01)

(58) Field of Classification Search
CPC ........................................................ G01B 5/28
USPC ............................................................ 73/104
See application file for complete search history.

(56) References Cited

U.S. PATENT DOCUMENTS

| | | |
|---|---|---|
| 6,751,342 B2 | 6/2004 | Shepard |
| 6,826,299 B2 | 11/2004 | Brown et al. |
| 6,990,215 B1 | 1/2006 | Brown et al. |
| 7,075,084 B2 | 7/2006 | Thompson et al. |
| 7,110,194 B2 | 9/2006 | Hubbs |
| 7,119,338 B2 | 10/2006 | Thompson et al. |
| 7,186,981 B2 | 3/2007 | Shepard et al. |
| 7,194,358 B2 | 3/2007 | Callaghan et al. |
| 7,287,902 B2 | 10/2007 | Safai et al. |
| 7,454,265 B2 | 11/2008 | Marsh |
| 7,513,964 B2 | 4/2009 | Ritter et al. |
| 7,587,258 B2 | 9/2009 | Marsh et al. |
| 7,643,893 B2 | 1/2010 | Troy et al. |
| 7,743,660 B2 | 6/2010 | Marsh et al. |
| 7,783,376 B2 | 8/2010 | Marsh et al. |

(Continued)

*Primary Examiner* — Eric S. McCall

(74) *Attorney, Agent, or Firm* — Ostrager Chong Flaherty & Broitman, P.C.

(57) ABSTRACT

Systems and methods for non-destructive inspection (NDI) of target objects having non-planar surfaces (such as aircraft components having internal stiffeners). A robotic NDI platform is equipped with an NDI sensor and a laser-based alignment system. The laser-based alignment system is operated in a manner to acquire surface profile information in an area of interest on a non-planar surface of the target object. Then the acquired surface profile data is processed by a computer to generate a motion plan for automatically guiding the robotic NDI platform and the NDI sensor to the correct locations, where images of the area of interest may be captured.

24 Claims, 25 Drawing Sheets

(56) References Cited

U.S. PATENT DOCUMENTS

| | | |
|---|---|---|
| 7,800,758 B1 | 9/2010 | Bridges et al. |
| 7,859,655 B2 | 12/2010 | Troy et al. |
| 8,043,033 B2 | 10/2011 | Clark |
| 8,467,071 B2 | 6/2013 | Steffey et al. |
| 8,713,998 B2 | 5/2014 | Troy et al. |
| 8,892,252 B1 | 11/2014 | Troy et al. |
| 9,250,213 B1 * | 2/2016 | Bossi .................. G01N 29/265 |
| 9,410,659 B2 | 8/2016 | Troy et al. |
| 2007/0269098 A1 | 11/2007 | Marsh |
| 2013/0135480 A1 | 5/2013 | Stratmann et al. |
| 2014/0305216 A1 * | 10/2014 | Hafenrichter .......... G01N 29/07 73/598 |
| 2015/0268033 A1 | 9/2015 | Troy et al. |
| 2018/0361571 A1 * | 12/2018 | Georgeson ............... B25J 5/007 |
| 2018/0361595 A1 * | 12/2018 | Troy ...................... B25J 13/088 |
| 2019/0283821 A1 * | 9/2019 | Georgeson ............. F03D 80/55 |
| 2019/0311555 A1 * | 10/2019 | Troy ................. H04N 5/23296 |

* cited by examiner

METHODS FOR INSPECTING STRUCTURES HAVING NON-PLANAR SURFACES USING LOCATION ALIGNMENT FEEDBACK

BACKGROUND

This disclosure relates to systems and methods for non-destructive inspection of structures using a tool mounted on the end of an arm of an automated apparatus.

Non-destructive inspection of structures involves thoroughly examining a structure without harming the structure or requiring significant disassembly. Inspection may be performed during manufacturing of a structure and/or after a structure has been put in service to determine the condition, quality, or structural state of the structure.

In the aircraft building industry, aircraft components (such as barrel-shaped fuselage sections, wing panels, and engine cowlings) made of composite material are typically subjected to non-destructive inspection. Such non-destructive inspection preferably includes inspecting the stiffeners (a.k.a. stringers) disposed on the inside of such composite aircraft components.

SUMMARY

The subject matter disclosed in some detail below is directed to systems and methods for non-destructive inspection (NDI) of structures (also referred to herein as "target objects") having non-planar surfaces (such as aircraft components having internal stiffeners). For example, a multiplicity of mutually parallel stringers may be joined to one side of a planar skin or to an interior surface of a cylindrical or cylinder-like skin, which structure may be non-destructively inspected using infrared thermography. In another example, a multiplicity of converging stringers may be joined to an interior surface of a conical or cone-like skin. The skin and stringers may be fabricated using carbon fiber-reinforced plastic (CFRP) material. The stringers may be hat stringers of a type having a flat cap and a trapezoidal cross-sectional profile (hereinafter referred to as "trapezoidal stringers").

In accordance with some embodiments, the robotic NDI platform comprises a holonomic-motion base, an infrared thermography scanner (hereinafter "IRT scanner"), and an automated scanner support apparatus (carried by the holonomic-motion base) that is under the control of a computer system that controls the motion of the robotic NDI platform (hereinafter "robot motion controller"). The robotic NDI platform is also equipped with a laser-based alignment system. The laser-based alignment system is operated in a manner to acquire surface profile information in an area of interest on a non-planar surface of a target object. Then the acquired surface profile data is processed by a computer to generate a motion plan for automatically guiding the robotic NDI platform and the NDI sensor to the correct locations where IRT images of the area of interest may be captured.

Although various embodiments of systems and methods for non-destructive inspection of structures having non-planar surfaces will be described in some detail below, one or more of those embodiments may be characterized by one or more of the following aspects.

One aspect of the subject matter disclosed in detail below is a method for non-destructive inspection of a non-planar surface, comprising: moving an end effector to a first position in proximity to the non-planar surface with a first orientation at which a distance sensor attached to the end effector is directed toward the non-planar surface; acquiring distance data for a multiplicity of points on the non-planar surface during a sweep of the distance sensor; generating surface profile data representing a surface profile of the non-planar surface from the distance data acquired; calculating a second position and a second orientation of the end effector using the surface profile data; moving the end effector to the second position and rotating the end effector to the second orientation; and performing a non-destructive inspection of a portion of the non-planar surface while the end effector is stationary at the second position with the second orientation using a non-destructive inspection sensor attached to the end effector.

Another aspect of the subject matter disclosed in detail below is a method for non-destructive inspection of a non-planar surface, comprising: moving a base of an end effector-carrying mobile platform to a location on a ground or floor in proximity to a structure having a non-planar surface; moving an end effector to an initial position in proximity to the non-planar surface with an initial orientation at which a distance sensor attached to the end effector is directed toward the non-planar surface; acquiring distance data for a multiplicity of points on the non-planar surface during a sweep of the distance sensor in a plane that intersects the non-planar surface; generating surface profile data representing a surface profile of the non-planar surface from the distance data acquired; generating a motion plan for the end effector based on the initial position and initial orientation of the end effector and the surface profile; alternatingly moving the end effector to and stopping the end effector at a series of locations in accordance with the motion plan; and performing a respective non-destructive inspection of a respective portion of the non-planar surface at each of the series of locations while the end effector is not moving using a non-destructive inspection sensor attached to the end effector.

A further aspect of the subject matter disclosed in detail below is a system for non-destructive inspection of a non-planar surface, comprising: a robotic non-destructive inspection mobile platform comprising a pivotable end effector, a distance sensor affixed to the end effector, a non-destructive inspection sensor affixed to the end effector, and motors for moving the end effector; and a computer system configured to perform the following operations: (a) controlling the motors to cause the end effector to rotate about a pivot axis; (b) activating the distance sensor to acquire distance data for a multiplicity of points on a non-planar surface of a structure to be inspected that lie in a plane that intersects the non-planar surface during rotation of the end effector; (c) receiving the distance data from the distance sensor; (d) generating surface profile data representing a surface profile of the non-planar surface from the distance data received; (e) calculating a starting position and a starting orientation of the end effector using the surface profile data; (f) controlling the motors to move the end effector to the starting position and rotate the end effector to the starting orientation; and (g) activating the non-destructive sensor to perform a non-destructive inspection of a portion of the non-planar surface while the end effector is stationary at the starting position with the second orientation.

Other aspects of systems and methods for non-destructive inspection of structures having non-planar surfaces are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

DETAILED DESCRIPTION

Figure 1:
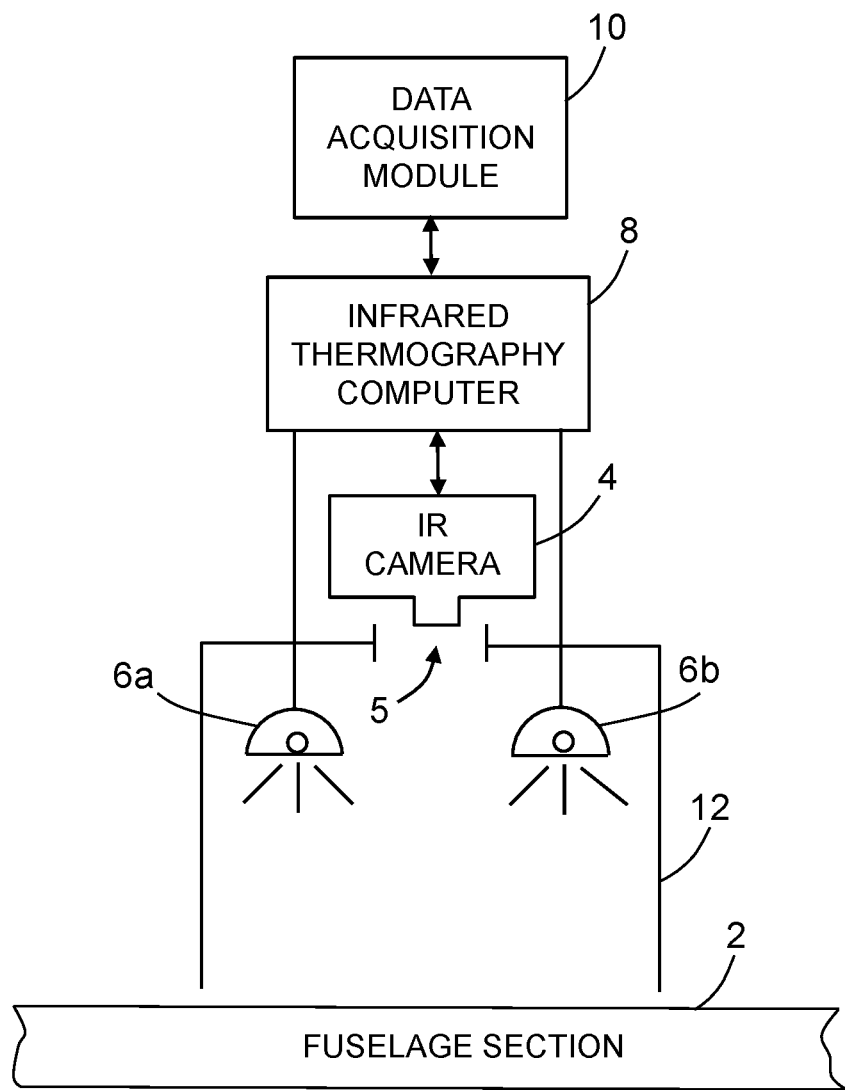
FIG. 1 is a block diagram identifying some components of a system for thermographic imaging of a fuselage section.

In accordance with one embodiment of a system for inspecting structures having non-planar surfaces, the robotic NDI platform comprises a holonomic-motion base, an infrared thermography scanner (hereinafter "IRT scanner"), and an automated scanner support apparatus (carried by the holonomic-motion base) that is under the control of a robot motion controller. The IRT scanner is mounted on an end effector which is pivotably coupled to the distal end of a vertically displaceable arm, which vertically displaceable arm is carried by the holonomic-motion base. This system also has a laser-based alignment system mounted to the end effector that can be used to acquire surface profile information. The acquired surface profile information is then used to enable an automated guidance process to acquire IRT scans.

In accordance with some embodiments, the laser-based alignment system includes a laser range meter that sweeps across a non-planar surface (e.g., one or more stringers joined to a skin), perpendicular to a major axis of the stringer, to create a cross-sectional profile representation of the stringer on the target object. Using this data, a computer generates a motion plan that is calculated to aim the IRT scanner at one or more angled surfaces of a target object for each captured IRT image. Ideally the focal axis of the infrared camera of the IRT scanner is parallel to a vector which is normal to the surface being inspected, but the motion plan may be designed to enable IRT scanning at other angles within a user-selectable range. That motion plan is then loaded into the robot motion controller. In preparation for an inspection procedure, the robot motion controller issues motor control signals that cause the holonomic-motion base and the end effector to move in accordance with the motion plan that includes multiple movements executed in sequence. In between successive movements, the stationary IRT scanner captures IRT images of respective portions of the surface of the target object.

The above-described concepts provide a method to automatically adapt to various surface shapes, such as hat stringers having flat or rounded caps. The process involves a sweeping motion of a laser range meter to continuously capture distance and angle data, which is then converted into Cartesian coordinates that describe the surface profile at that location. This surface profile data is then used by the robot motion controller to determine how to move the robot and end effector to capture IRT images of the surface at that location. The process also enables automated scanning of objects with variable or unknown surface shapes. The technique can also be used as part a semi-automated process where an operator manually guides the robotic platform into an approximate location and then uses the automated alignment process to guide the robot and end effector into the final location for acquiring the IRT image.

For the purpose of illustration, systems and methods for non-destructive inspection of a stiffened aircraft component made of composite material (e.g., a composite laminate made of fiber-reinforced plastic) using location alignment feedback and active thermography will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Infrared thermography methods and devices make it possible to perform non-destructive testing of a material to detect defects, variations in the properties of the material, or differences in thickness of a coating or layer of the material. Infrared imaging can detect local variations in thermal diffusivity or thermal conductivity at or beneath the surface of the material. Infrared thermography can be used on metals, such as ferrous materials, including steel, or on non-metallic materials, such as plastics, ceramics, or composite materials.

Active thermography is used to non-destructively evaluate samples for sub-surface defects. It is effective for uncovering internal bond discontinuities, delaminations, voids, inclusions, and other structural defects that are not detectable by visual inspection of the sample. Generally, active thermography involves heating or cooling the sample to create a difference between the sample temperature and the ambient temperature and then observing the infrared thermal signature that emanates from the sample as its temperature returns to ambient temperature. An infrared camera is used because it is capable of detecting any anomalies in the cooling behavior, which would be caused by sub-surface defects blocking the diffusion of heat from the sample surface to the sample's interior. More particularly, these defects cause the surface immediately above the defect to cool at a different rate than the surrounding defect-free areas. As the sample cools, the infrared camera monitors and records an image time sequence indicating the surface temperature, thereby creating a record of the changes in the surface temperature over time.

Typically, the surface of the material is heated using a flash lamp and after a fixed period of time, a thermal image is taken of the surface of the heated material. Systems for thermographic heating typically employ xenon flashtubes and off-the-shelf photographic power supplies for sample excitation. An infrared camera images the infrared spectral radiance from the surface of the material, which is representative of the temperature of the surface of the material. Differences in temperature of the surface of the material indicate differing thermal characteristics of the material. These variations in thermal characteristics of the material indicate a possible material defect or the inclusion of a foreign material.

Structural thickness and stack-up geometry needed for infrared signature processing is obtained by knowing the exact location of the infrared camera's field of view on the surface of the fuselage section.

FIG. 1 is a block diagram identifying some components of a system for thermographic imaging of a fuselage section 2. This infrared thermographic inspection system comprises a digital infrared camera 4 having a lens that is directed through a camera lens aperture 5 in a hood 12, which is designed to form a hooded enclosure adjacent to the surface being inspected. A pair of flash lamps 6a and 6b are disposed inside and in fixed spatial relationship to the hood 12. The flash lamps 6a and 6b produce flashes of light in response to trigger signals from an infrared thermography computer 8, which also controls operation of the infrared camera 4. One example of a type of infrared camera 4 suitable for use with at least some of the embodiments disclosed herein includes a focal plane array (FPA) device configured to act as a spectral radiometer. Further details concerning other components that may be included in a flash lamp assembly of a type comprising an infrared camera, a pair of flash lamps and a hood can be found, for example, in U.S. Pat. No. 7,186,981.

In accordance with one method of thermographic inspection, first the flash lamps 6a and 6b are triggered to transfer heat to the composite material of the fuselage section 2. Preferably, during cooling of the composite material, the infrared camera 4 is triggered periodically to capture successive digital images of the varying spectral radiance of the heated portion of the fuselage section 2. Preferably, the thermally excited (heated) region of the composite material being inspected will cool monotonically after the excitation source removed until the sample reaches thermal equilibrium with its surroundings. The digital infrared imaging data captured by infrared camera 4 is received by the infrared thermography computer 8 for processing. The infrared thermography computer 8 is programmed to process infrared imaging data to detect and locate material edges, foreign objects under the surface of the material, or other material anomalies, such as delaminations and out-of-tolerance porosity. The infrared imaging data may be displayed on a display monitor (not shown in FIG. 1), which may be integrated with or separate from infrared thermography computer 8.

In accordance with the embodiment depicted in FIG. 1, the infrared thermography computer 8 may have digital image acquisition capabilities to convert the infrared imaging data from the infrared camera 4 to a format that can be analyzed and mathematically manipulated by the infrared thermography computer 8. An optional data acquisition module 10 may be incorporated in or separate from (as depicted in FIG. 1) the infrared thermography computer 8. The data acquisition module 10 may be used if the infrared camera 4 captures multiple spatially different images to generate a complete mosaic image of the surface of the composite structure when the latter is too large to fit in a single image frame. The infrared thermography computer 8 may be further programmed to analyze the infrared imaging data captured by the infrared camera 4. In particular, the time history of the surface temperature response of the fuselage section 2 as it returns to room temperature can be analyzed to detect the presence of defects in the composite material.

In the context of the specific application of inspecting fuselage sections, a non-destructive inspection system may comprise means for scanning the skin of the fuselage section. In the embodiments disclosed below, external scanning means comprise a robot equipped with an infrared camera. The robot comprises a movable robot base and a robotic arm having a proximal end coupled to the robot base. The robot base may be a mobile holonomic crawler vehicle. An infrared thermography scanner is coupled to a distal end of the robotic arm. The infrared thermography scanner comprises an infrared camera and two or more flash lamps attached inside a hood. The hood may be sized to cover a rectangular area on the outer surface of the fuselage section. The infrared imaging data acquired from adjacent rectangular areas can be stitched together based on measurements of the respective locations of the robot base using a local positioning system. The stitching process may be performed on a real-time basis or may be performed at a later time.

Various embodiments of NDI systems configured to use the location alignment feedback concepts disclosed herein will now be described in some detail. In accordance with some embodiments, the NDI system is an automated platform with an end effector that is able to reach to the centerline of the top and bottom of the fuselage from either side of the airplane. This NDI system comprises a Mecanum-wheeled holonomic-motion base, a vertical extension mast carried by the base, a pivoting end effector, proximity sensors, and support for multiple types of NDI devices mounted on the end effector. The vertical support mast with a pivoting end effector on an extension arm allows the inspection of the full height of an airplane fuselage section. The holonomic-motion base allows the robot to quickly and efficiently re-position the NDI scanner unit along the length of the fuselage. Motion control software with distance sensor feedback enables automatic capture of overlapping grid pattern scans. Reference position data is also captured to align the NDI scans with the appropriate airplane coordinate system. The system is relative easy to set up and use in either the automated or manual control mode.

Figure 2:
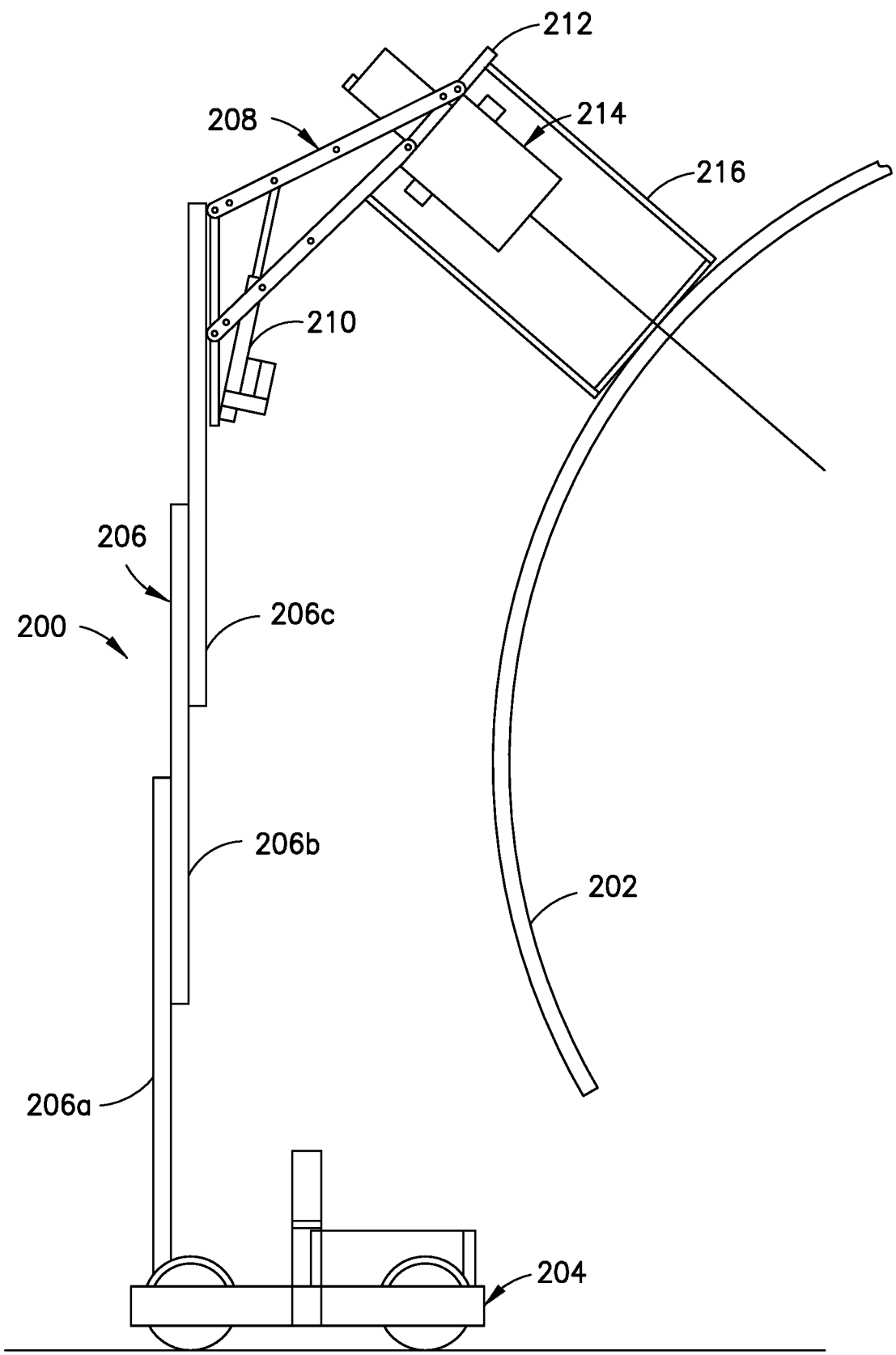
FIG. 2 is a diagram representing a side view of a ground-based robotic NDI mobile platform in accordance with one embodiment.

FIG. 2 is a diagram representing a side view of a ground-based robotic NDI mobile platform 200 in accordance with one embodiment. This platform comprises a holonomic-motion base 204, an infrared thermography (IRT) scanner 214, and an automated scanner support apparatus (carried by the holonomic-motion base 204) that is under the control of a robot motion controller (not shown). The automated scanner support apparatus comprises a vertical extendible mast 206 that can be extended and retracted as needed to change the elevation of the IRT scanner 214. The vertical extendible mast 206 comprises a first mast section 206*a* having a linear axis and one end fixedly coupled to a holonomic-motion base 204, a second mast section 206*b* having a linear axis and which is slidably coupled to the first mast section 206*a* for sliding along a line that is parallel to the axis of the first mast section 206*a*, and a third mast section 206*c* having a linear axis and which is slidably coupled to the second mast section 206*b* for sliding along a line that is parallel to the axis of the second mast section 206*b*. In accordance with one implementation, the vertical extension of the mast is controlled by a single motor and a cable-pulley system.

The ground-based robotic NDI mobile platform 200 depicted in FIG. 2 further comprises a four-bar linkage arm mechanism 208 to control the position and orientation of an end effector 212 which is pivotably coupled to the distal end of the four-bar linkage mechanism. The driver link of the four-bar linkage mechanism 208 is driven to rotate relative to the third mast section 206*c* by a motor-driven lead screw or hydraulic cylinder 210. The IRT scanner 214 is mounted to and rotates with the end effector 212. An optional IRT shroud 216 surrounds the IRT scanner 214 to isolate the volume of space between the IRT scanner 214 and a curved workpiece 202 (e.g., a fuselage section) from the surrounding environment. This shroud may be removed when the IRT scanner is used to acquire IRT images of a stiffened structure having a non-planar surface, such as a multiplicity of stringers integrally formed or adhesively bonded to a skin of an aircraft component.

Figure 3:
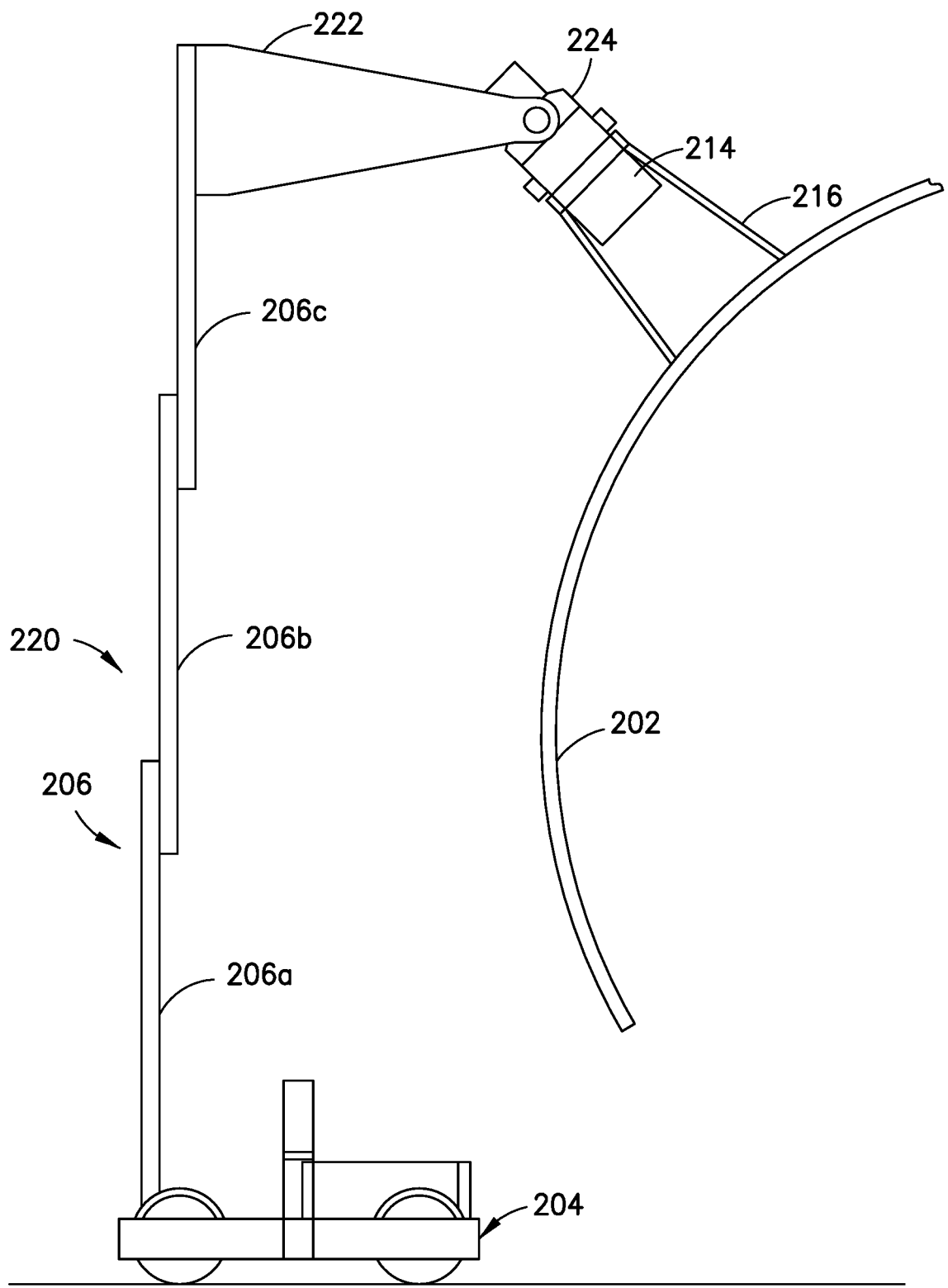
FIG. 3 is a diagram representing a side view of a ground-based robotic NDI mobile platform in accordance with another embodiment.
Figure 4:
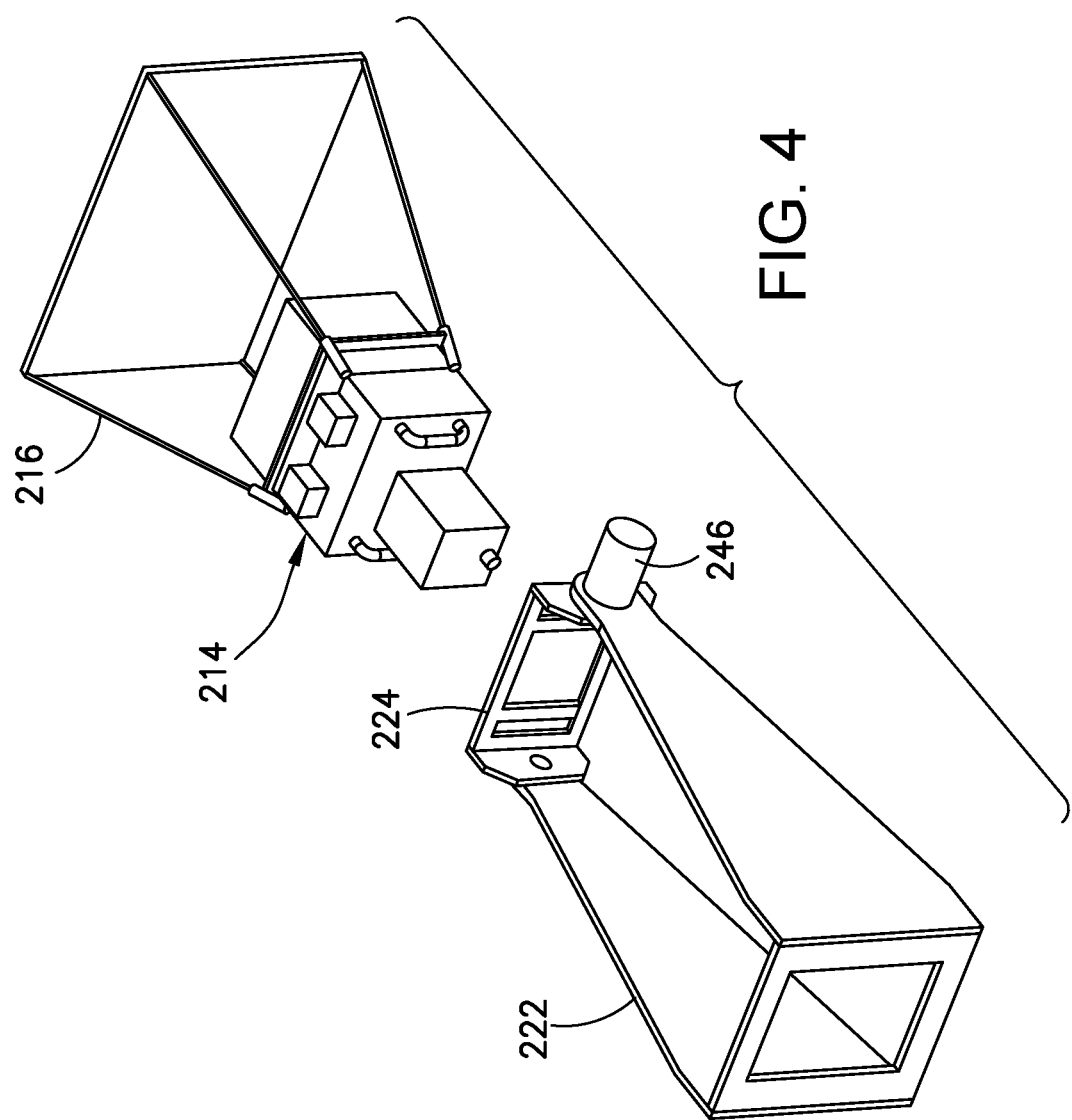
FIG. 4 is a diagram representing an exploded view of some components of the robotic NDI mobile platform depicted in FIG. 3.

FIG. 3 is a diagram representing a side view of a ground-based robotic NDI mobile platform 220 in accordance with another embodiment. This embodiment comprises a vertical extendible mast 206, a rigid extension arm 222 fixedly coupled to the third mast section 206*c*, and an end effector 224 pivotably coupled to the distal end of the two sides of the rigid extension arm 222. FIG. 4 is a diagram representing an exploded view of some components of the robotic NDI mobile platform 220 depicted in FIG. 3. This embodiment has independent programmable control over the extension height as well as the end effector pitch. Pitch rotation of the end effector 224 can be driven by an angular position control motor 246 (see FIG. 4) with a non-back-drivable gearbox (not shown).

Figure 5:
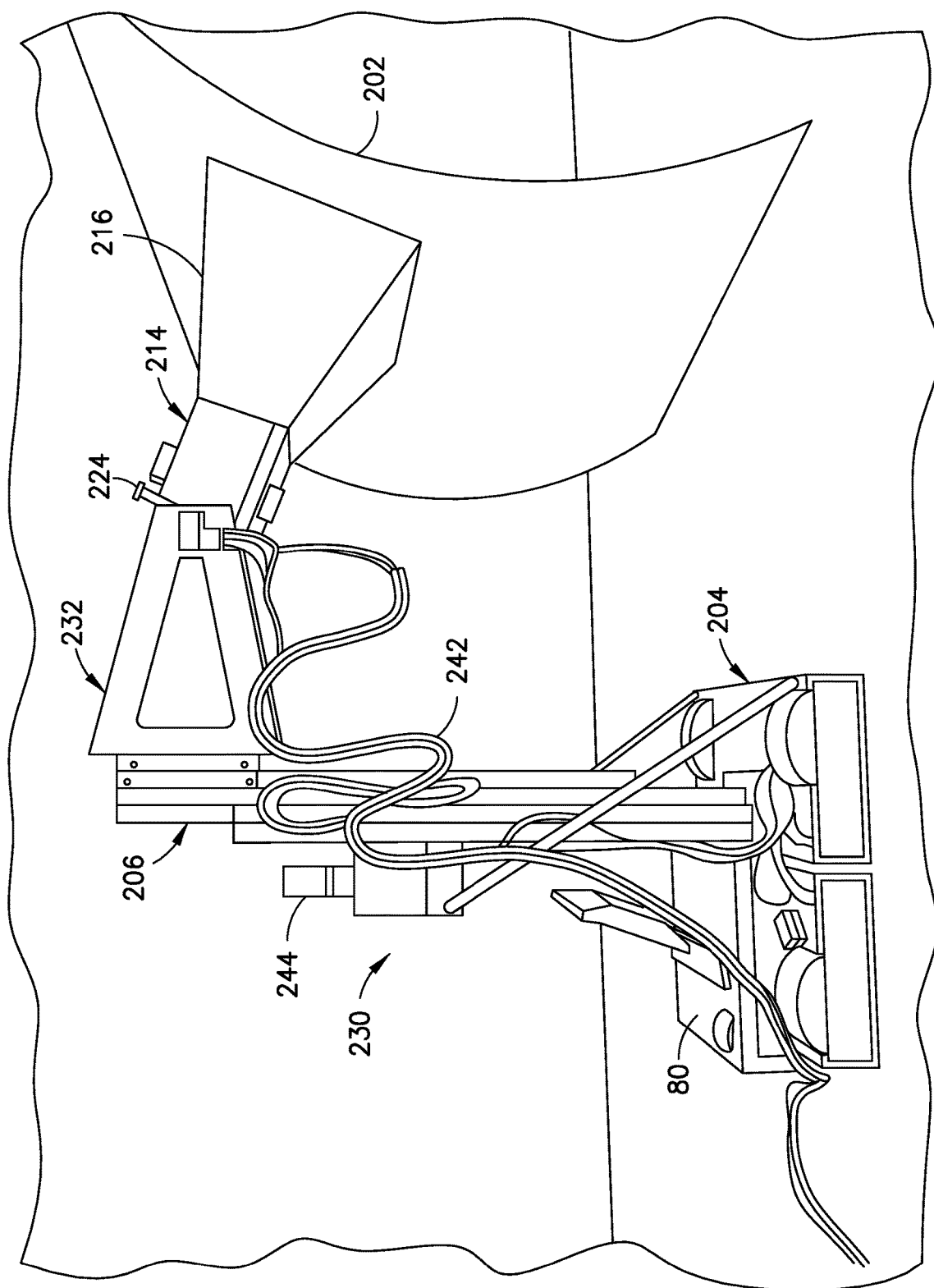
FIG. 5 is a diagram representing a perspective view of a ground-based robotic NDI mobile platform in the process of scanning a curved workpiece made of composite material. (Laser range meters mounted to the robot end effector are not shown in FIG. 5, but are shown in FIG. 6.)
Figure 16:
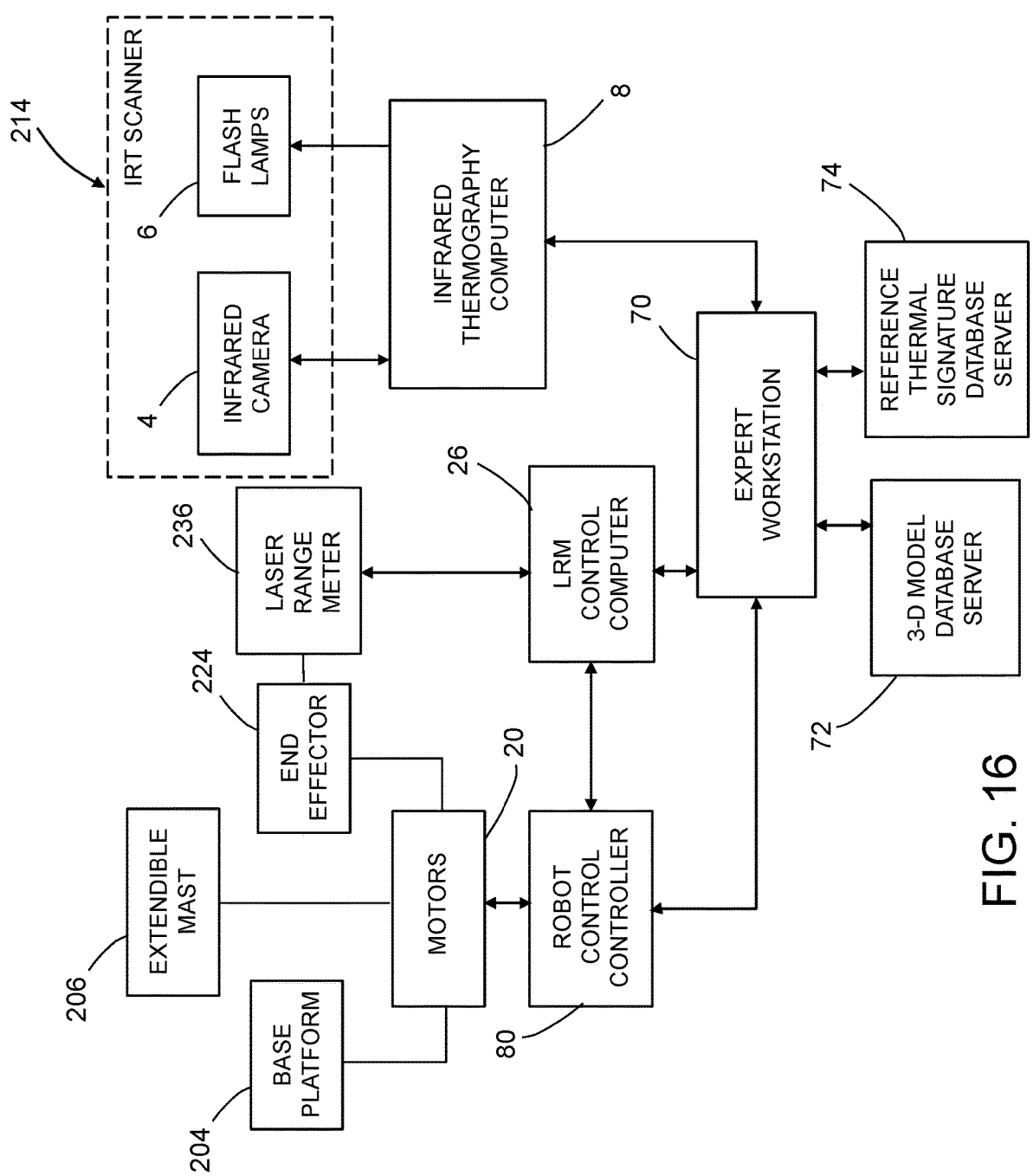
FIG. 16 is a block diagram identifying some components of a system for infrared thermographic inspection of a composite structure having a non-planar surface in accordance with some embodiments.

FIG. 5 is a diagram representing a perspective view of—a ground-based robotic NDI mobile platform 230 in the process of scanning a curved workpiece 202 made of composite material. The IRT scanner 214 is mounted to an end effector 224, which end effector 224 in turn is pivotable about a pitch axis under the control of a robot motion controller 80. The end effector 224 is pivotably coupled to a rigid extension arm 232 which is in turn fixedly coupled to the uppermost mast section of the vertical extendible mast 206. The IRT scanner 214 sends acquired data to the infrared thermography computer 8 (not shown in FIG. 5, but see FIG. 16) by way of an electrical cable 242. Digital signals sent between the robot motion controller 80 and the infrared thermography computer 8 directly or via expert workstation 70 (as indicated in FIG. 16) enable synchronization between the separate robot and IRT scanner systems. The robotic NDI mobile platform 230 is also equipped with a warning light 244 which switches on and off when the system is enabled.

In accordance with one proposed implementation, the holonomic-motion base 204 employs four Mecanum wheels arranged with a Type A pair on one diagonal and a Type B pair on the other. The Type A Mecanum wheels differ from the Type B Mecanum wheels in that the tapered rollers of the former are oriented at different angles than the tapered rollers of the latter. Each Mecanum wheel can be driven to rotate by a respective independently controlled stepper motor. A Mecanum-wheeled vehicle can be made to move in any direction and turn by controlling the speed and direction of rotation of each wheel. For example, rotating all four wheels in the same direction at the same rate causes forward or backward movement; rotating the wheels on one side at the same rate but in the opposite direction of the rotation by the wheels on the other side causes the vehicle to rotate; and rotating the Type A wheels at the same rate but in the opposite direction of the rotation of the Type B wheels causes sideways movement. The holonomic-motion base 204 moves under the control of an onboard control computer (e.g., robot motion controller 80 identified in FIG. 16). The structure and function of a suitable Mecanum-wheeled holonomic-motion base is described in U.S. Pat. No. 9,410,659, the disclosure of which is incorporated by reference herein in its entirety.

In accordance with one embodiment, a multiplicity of sensors (not shown FIG. 5) are mounted around the periphery of the holonomic-motion base 204 to indicate the presence of obstacles in that specific region of the vehicle. The motion controller uses that sensor data to block additional motion from occurring in the direction associated with that particular sensor, but motion in the other directions is still allowed. Potential sensors include contact sensors, thru-beam sensors, and proximity sensors. This collision avoidance system would operate in a similar manner similar to what is described in U.S. Pat. No. 7,194,358.

As previously mentioned, the location alignment feedback process disclosed herein employs distance sensors to determine the position and orientation (i.e., the location) of the IRT scanner 214 relative to the target object (e.g., workpiece 202). At least three non-collinear distance measurement devices can be used to compute relative location in real-time. To mitigate any possibility of scratching, marring or otherwise damaging the surface of the target object, laser range meters were selected instead of contact probes for use as distance sensors. In addition to close-range distance and angle guidance, the laser range meters also provide the advantage of longer range distance feedback to the platform motion controller for general navigation purposes.

Figure 6:
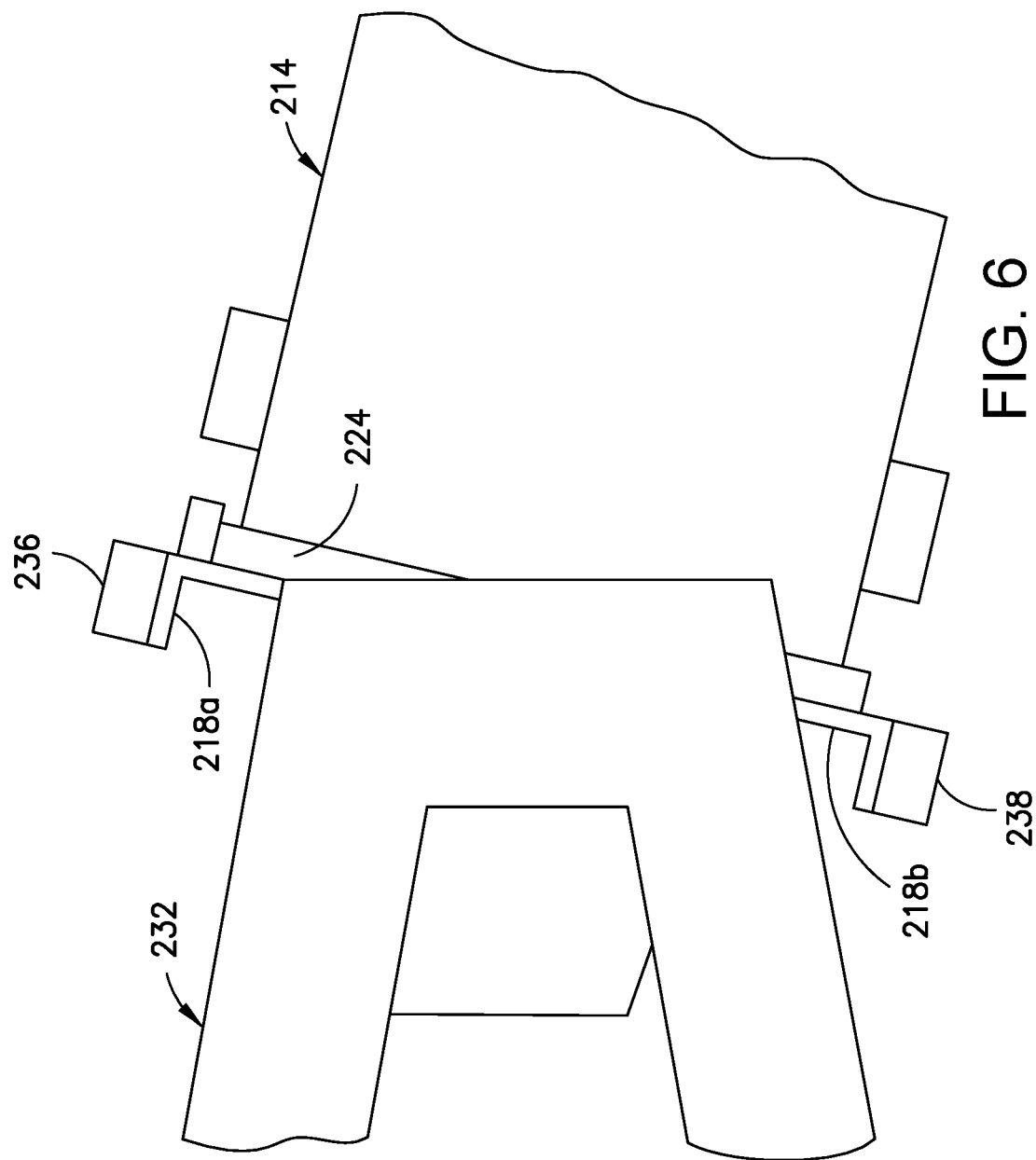
FIG. 6 is a diagram representing a side view of a portion of the robotic NDI mobile platform depicted in FIG. 5, which portion includes the end effector and laser range meters mounted to the end effector.

In accordance with one implementation, three laser range meters (not shown in FIG. 5, but see laser range meters 236, 238 and 240 in FIG. 7) are mounted to the end effector 224. FIG. 6 is a diagram representing a side view of a portion of the robotic NDI mobile platform depicted in FIG. 5, which portion includes the end effector 224 and three laser range meters mounted to the end effector 224. Only two of the three laser range meters (i.e., laser range meters 236 and 238) are visible in FIG. 6; the third laser range meter (i.e., laser range meter 240) is visible in FIG. 7. As seen in FIG. 6, the first laser range meter 236 is attached to an L-shaped mounting plate 218a, which is in turn attached to the end effector 224. Similarly, the second laser range meter 238 is attached to an L-shaped mounting plate 218b (shown in FIGS. 6 and 7), which is in turn attached to the end effector 224; and the third laser range meter 240 is attached to an L-shaped mounting plate 218c (shown in FIG. 7), which is in turn attached to the end effector 224.

Each laser range meter includes a laser capable of transmitting a laser beam along an aim direction vector. Each laser range meter is further configured to measure the distance to the point of impingement of the laser beam on a surface of a target object. The most common form of laser range meter operates on the time-of-flight principle by sending a laser pulse in a narrow beam towards the target object and measuring the time taken by the pulse to be reflected off the target object and returned to a photodetector incorporated inside the laser range meter. With the speed of light known and an accurate measurement of the time made, the distance from the laser range meter to the spot on the surface of the target object where the laser beam impinges can be calculated. Many pulses are fired sequentially while the end effector is at a known location and the average response is most commonly used.

Figure 7:
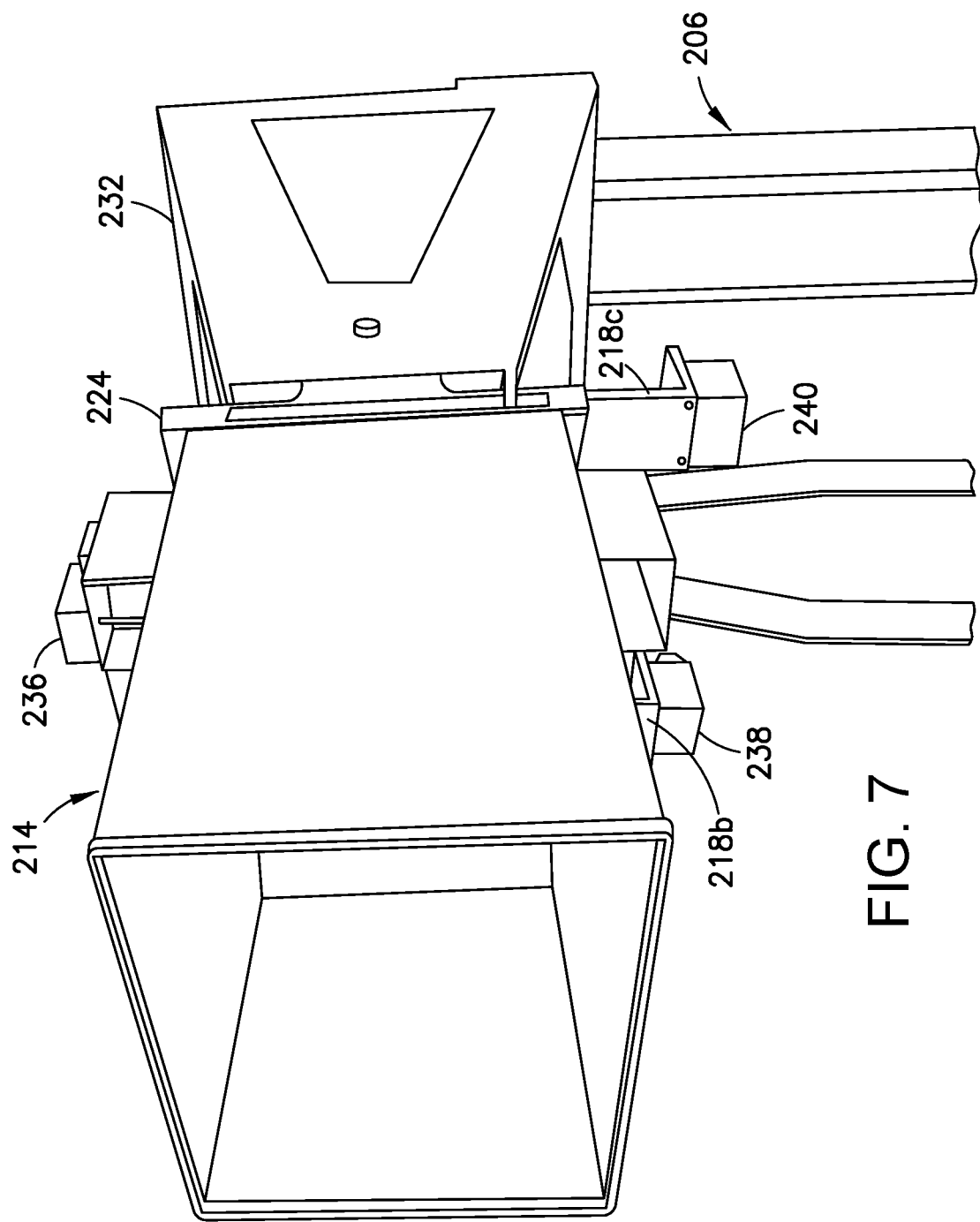
FIG. 7 is a diagram representing a perspective view of an infrared thermography scanner mounted to the end effector of the robotic NDI mobile platform depicted in FIG. 5.
Figure 8:
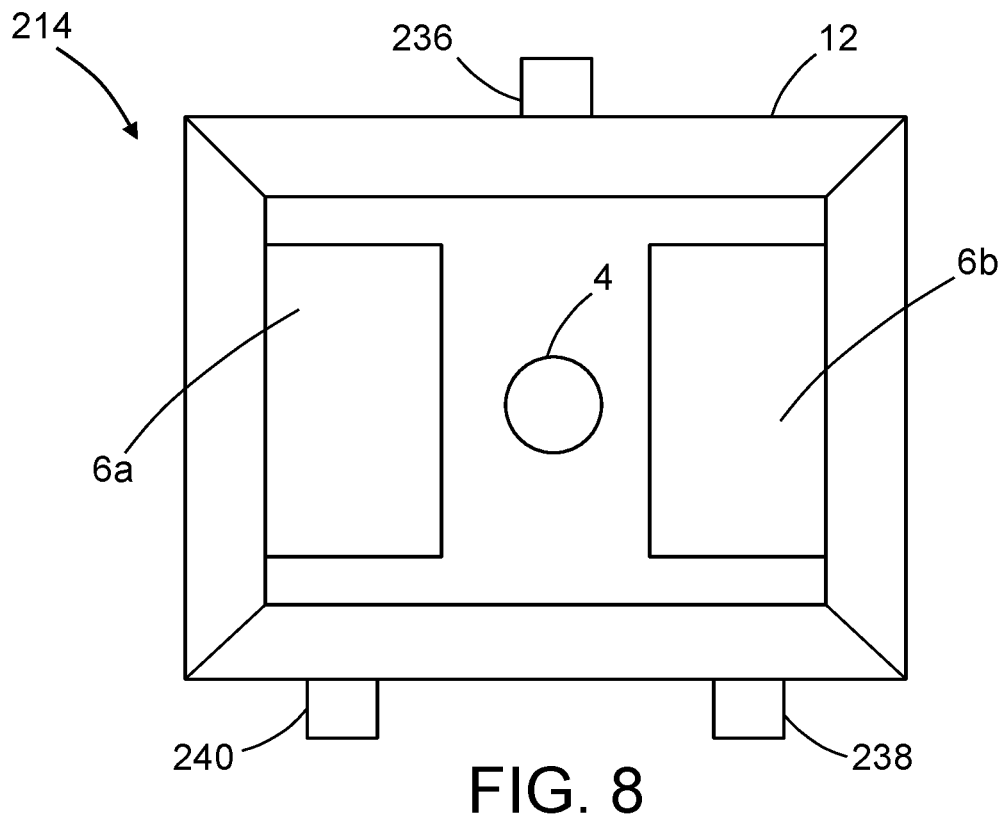
FIG. 8 is a diagram representing a front view of the infrared thermography scanner depicted in FIG. 7.

FIG. 7 is a diagram representing a perspective view of the IRT scanner 214 (with shroud 216 removed) mounted to the end effector 224, which in turn is pivotably coupled to the rigid extension arm 232. As previously described, laser range meters 236, 238 and 240 are mounted to the end effector 224. As best seen in the front view of FIG. 8, laser range meter 236 is mounted at an elevation which is higher than the elevation of the highest point of the hood 12 of the IRT scanner 214, whereas the laser range meters 238 and 240 are mounted at an elevation which is lower than the elevation of the lowest point of the hood 12 of the IRT scanner 214, separated by a distance. Preferably the laser range meters 236, 238 and 240 are disposed at the vertices of an isosceles triangle.

Figure 9:
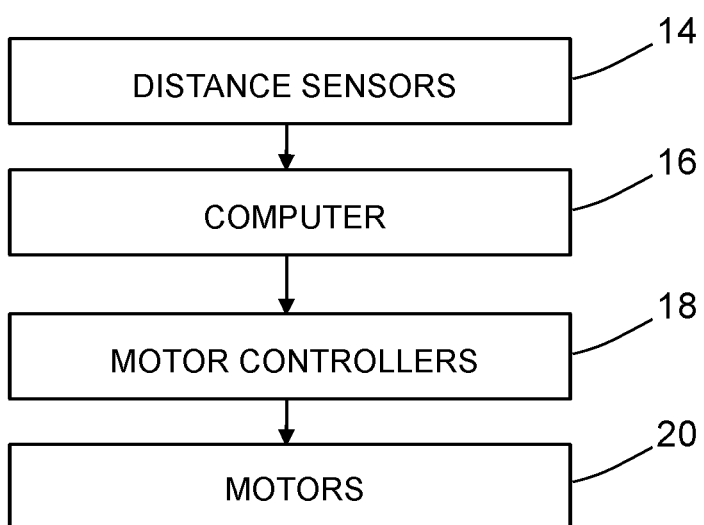
FIG. 9 is a block diagram identifying some components of an alignment system in accordance with some embodiments.

FIG. 9 is a block diagram identifying some components of an alignment system in accordance with one embodiment. The alignment system includes at least three distance sensors 14 (e.g., laser range meters 236, 238 and 240 seen in FIGS. 7 and 8) that provide distance information to a computer 16 (e.g., robot motion controller 80 identified in FIG. 16). The computer 16 is configured (e.g., programmed) to determine what movements are needed to align the end effector 224 with the surface of the target object based on the distance information received from the distance sensors 14. These movements may include one or more of the following: moving the holonomic-motion base 204 to a new location; rotating the holonomic-motion base 204 about a yaw axis; extending or retracting the vertical extendible mast 206; and pivoting the end effector 224 about a pitch axis. The robotic NDI mobile platform comprises a multiplicity of motors 20 which are controlled by respective motor controllers 18. In accordance with one embodiment, the computer 16 is configured to send command signals to selected motor controllers 18 to activate the robotic movements needed to align the end effector 224 with the normal to a planar or nearly planar surface on the target object or reorient the end effector 224 with respect to one or more non-planar surfaces on the target object (e.g., the cap and one side of a trapezoidal stringer).

When inspecting an external concave curved surface of a cylinder-like aircraft component (e.g., a fuselage section, such as in FIG. 2 or FIG. 3), the laser range meters 236, 238 and 240 can be used to determine distances to the target object, as disclosed in U.S. patent application Ser. No. 15/623,304. This information is then used to align the optical axis of the infrared camera with the normal to the external curved surface at the point where the optical axis intersects the external curved surface. A method for determining the pitch angle of the end effector 224 and the yaw angle of the holonomic-motion base 204 using laser range meters will now be described with reference to FIGS. 10A-10C.

Figure 10A:
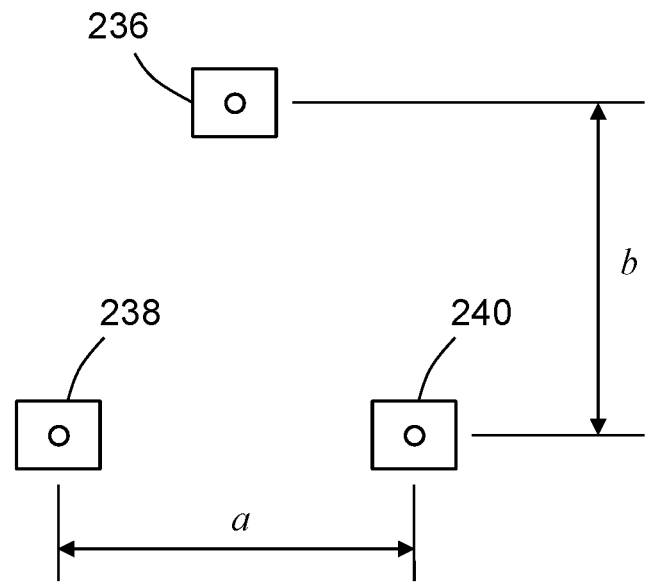
FIGS. 10A through 10C are diagrams representing front, side and top views respectively of three laser range meters arranged in a triangular pattern in a common plane perpendicular to the aim direction of the lasers and directed at respective spots on a surface of a target object, the laser range meters and spots being separated by respective distances.
Figure 10B:
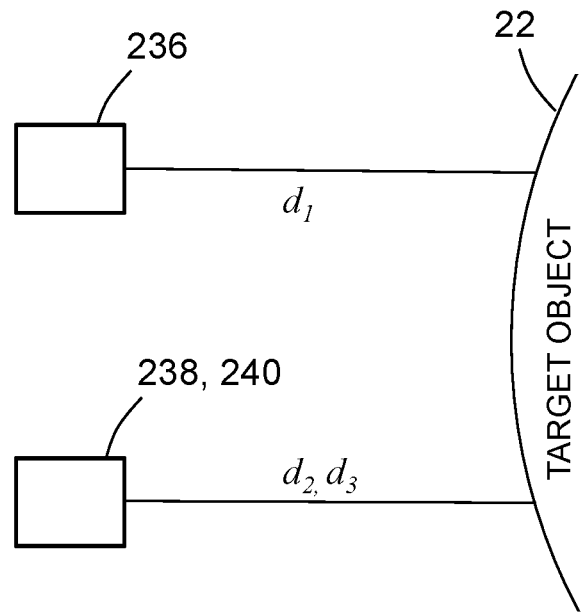
Figure 10C:
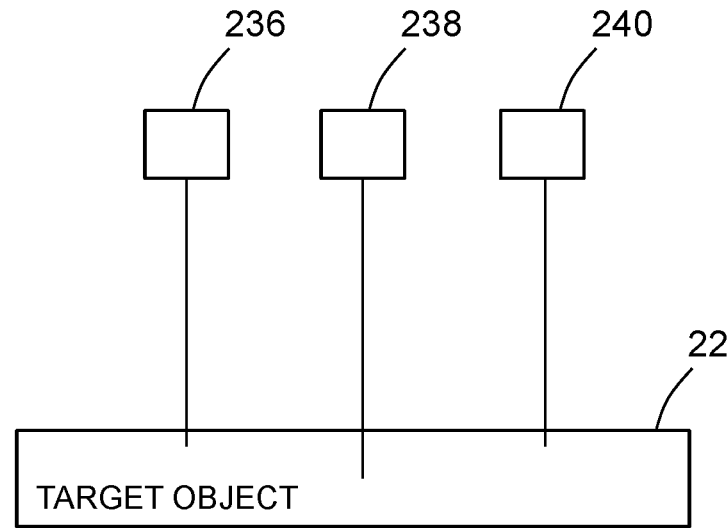

FIGS. 10A through 10C are diagrams representing front, side and top views respectively of three laser range meters 236, 238 and 240 arranged in a triangular pattern in a common plane and directed at respective spots on a concave curved surface of a target object 22, the laser range meters and spots being separated by respective distances. FIG. 10A shows an arrangement wherein the distance separating the laser range meters 238 and 240 (i.e., the base of the isosceles triangle) is a and the distance separating the laser range meter 236 and a point midway between the laser range meters 238 and 240 (i.e., the height of the isosceles triangle) is b. FIG. 10B shows respective measured distances $d_1$, $d_2$, and $d_3$ from the laser range meters 236, 238 and 240 to the surface of the target object 22. Equations (1) and (2) can be used to calculate the pitch and yaw angles:

$$\text{PitchAngle} = \operatorname{atan} 2(d_1 - (d_2 + d_3)/2, b) \tag{1}$$

$$\text{YawAngle} = \operatorname{atan} 2(d_2 - d_3, a) \tag{2}$$

where PitchAngle and YawAngle are the current computed angles for the alignment apparatus shown in FIGS. 10A-10C relative to the surface of the target object 22. The goal is for these angles, which are measured relative to the surface normal at the current location where the optical axis intersects the surface, to be equal to zero; and the process to achieve the goal angles is described below.

With the current yaw and pitch angles calculated, the system motion controller can use a velocity control method for the controlled motions: pan, tilt, and distance. A feedback controller, such as a proportional-integral-derivative (PID) controller, can be used to drive to zero the error between the current angle and the desired angle. Equations (3) and (4) can be used to compute the pitch and yaw motion control:

$$\text{PitchRate} = Kp_{pitch} * (\text{PitchAngle} - \text{PitchAngle}_{goal}) \tag{3}$$

$$\text{YawRate} = Kp_{yaw} * (\text{YawAngle} - \text{YawAngle}_{goal}) \tag{4}$$

where PitchRate and YawRate describe the angular rotation rates about the pitch axis of the end effector 224 and yaw axis of the holonomic-motion base 204, respectively; $Kp_{pitch}$ and $Kp_{yaw}$ are the proportional feedback gains associated with the pitch and yaw axes, respectively; PitchAngle and YawAngle are the angles computed from Eqs. (1) and (2), respectively; and $\text{PitchAngle}_{goal}$ and $\text{YawAngle}_{goal}$ are the desired goal angles to which the controller is driving the system toward (as mentioned earlier, these are both zero for this example). Integral and derivative feedback may also be used, but are not shown here.

The base velocity equations are as follows:

$$\text{Vel}_x = Kp_x * (\text{MinDist}_x - \text{offset}_x) \tag{5}$$

$$\text{Vel}_y = Kp_y * (\text{MinDist}_y - \text{offset}_y) \tag{6}$$

where $\text{Vel}_x$ and $\text{Vel}_y$ are the lateral velocities of the base; $Kp_x$ and $Kp_y$ are the proportional feedback gains for the X and Y directions of the base, respectively; $\text{MinDist}_x$ and $\text{MinDist}_y$ are the smallest values measured by the lasers in the X and Y directions, respectively; and $\text{offset}_x$ and $\text{offset}_y$ are the goal offset distances. For some applications, the lasers are not configured to measure in both X and Y directions; in those cases the X or Y velocity control equations associated with the alignment process would not be used.

Figure 11:
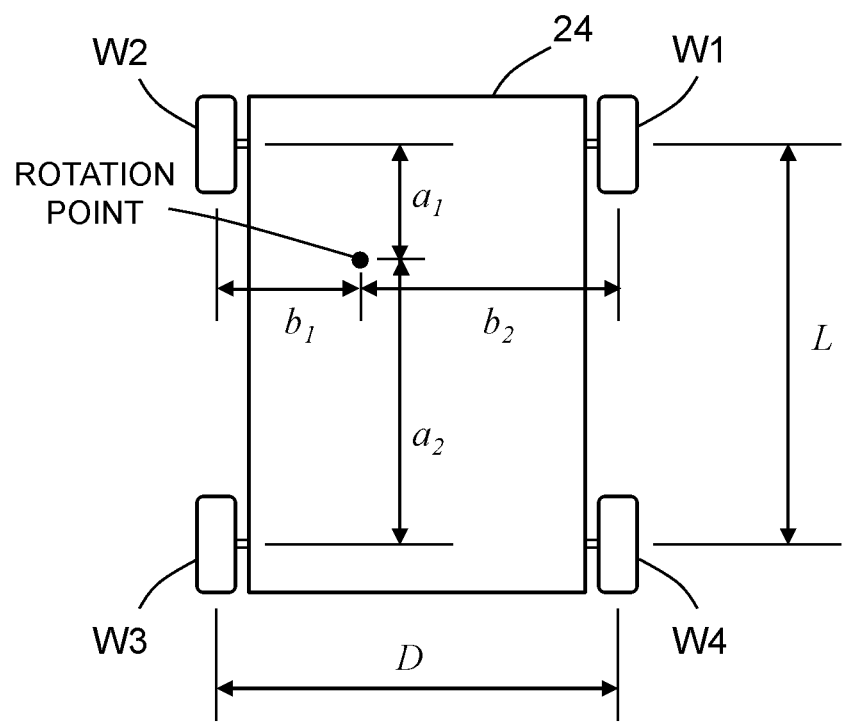
FIG. 11 is a diagram representing a top view of a holonomic-motion base having four Mecanum wheels with various dimensions indicated by double-headed arrows.

For a holonomic-motion base 204 that comprises a base frame 24, one pair of Type A Mecanum wheels W1 and W3 along one diagonal and one pair of Type B Mecanum wheels W2 and W4 along the other diagonal (shown in FIG. 11), kinematics can be used to compute the four individual wheel velocities. The dimensions of the vehicle (L and D) and desired rotation point (described by the distances $a_1$, $a_2$, $b_1$, $b_2$) are shown in FIG. 11. The individual wheel velocities for wheels W1 through W4 are shown in Eqs. (7) through (10):

$$V_{W1} = \text{Vel}_y - \text{Vel}_x + \text{YawRate} * (a_1 + b_1) \tag{7}$$

$$V_{W2} = \text{Vel}_y + \text{Vel}_x - \text{YawRate} * (a_1 + b_2) \tag{8}$$

$$V_{W3} = \text{Vel}_y - \text{Vel}_x - \text{YawRate} * (a_2 + b_2) \tag{9}$$

$$V_{W4} = \text{Vel}_y + \text{Vel}_x + \text{YawRate} * (a_2 + b_1) \tag{10}$$

where $V_{Wi}$ (for i=1, 2, 3, 4) are individual wheel velocities; $\text{Vel}_x$ and $\text{Vel}_y$ are the lateral velocities from Eqs. (5) and (6); YawRate is the yaw rotation rate from Eq. (4); and $a_1$, $a_2$, $b_1$, $b_2$ are the rotation point distances as shown in FIG. 11.

The primary pivot configurations for the end effector are the following: (a) one-axis pivot: one motor, one angle sensor; and (b) two-axis gimbal: two motors, two angle sensors.

The above-described method for aligning the optical axis of the infrared camera with the normal to a planar or a concave (or convex) curved surface being inspected is less useful when the surface has both concavities and convexities. For example, the above-described method for aligning the optical axis of the infrared camera is less useful when inspecting an array of stringers joined to a skin of an aircraft component. This disclosure proposes a method for orienting an end effector with respect to a non-planar surface, such as the internal surface of a structure consisting of a skin having a multiplicity of stringers joined thereto. First, the above-described laser-based alignment system is used to acquire surface profile information. Then the acquired surface profile information is used to enable an automated guidance process to acquire IRT scans.

Figure 12:
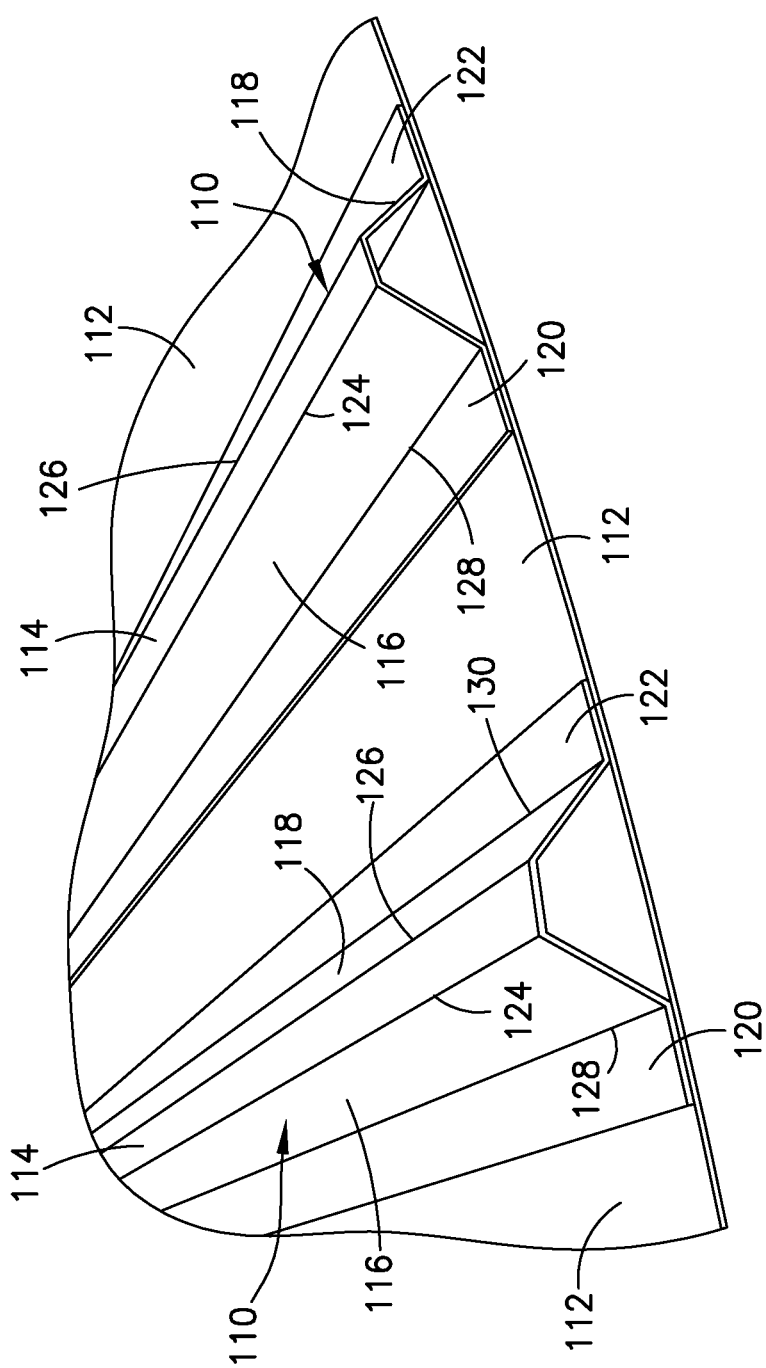
FIG. 12 is a diagram representing a perspective view of a structure comprising trapezoidal stringers attached to a skin.

FIG. 12 is a perspective view of a structure with two trapezoidal stringers 110 made of composite material (e.g., CFRP). The structure includes a skin 112 to which individual or connected trapezoidal stringers 110 are attached to stiffen the overall structure. Although the skin 112 depicted in FIG. 12 is planar, trapezoidal stringers 110 may be integrally formed with or attached to skins having curved profiles, including but not limited to concave or convex profiles or more complex contours.

Each trapezoidal stringer 110 is a trapezoidal structure comprising angled sides 116 and 118 which connect to a cap 114 at corners 124 and 126 respectively. Each of the angled sides 116, 118 and the cap 114 may be planar or nearly planar. Each trapezoidal stringer 110 is affixed to the skin 112 at flanges 120 and 122, which connect to the angled sides 116 and 118 of the trapezoidal stringer 110 at respective corners 128 and 130. It should be understood that the term "corner" as used herein refers to a radiused surface.

To perform an IRT inspection of the trapezoidal stringers 110 depicted in FIG. 12, the system depicted in FIG. 5 may be used with the shroud 216 removed. FIGS. 13A through 13E are diagrams representing respective side views of a target object 22 having a plurality 100 of trapezoidal stringers at five stages of an automated surface profile scanning procedure. In this example, the plurality 100 includes two trapezoidal stringers 110a and 110b. However, it should be appreciated that the innovative technology disclosed herein may be used to inspect a single trapezoidal stringer or two or more trapezoidal stringers.

Figure 13A:
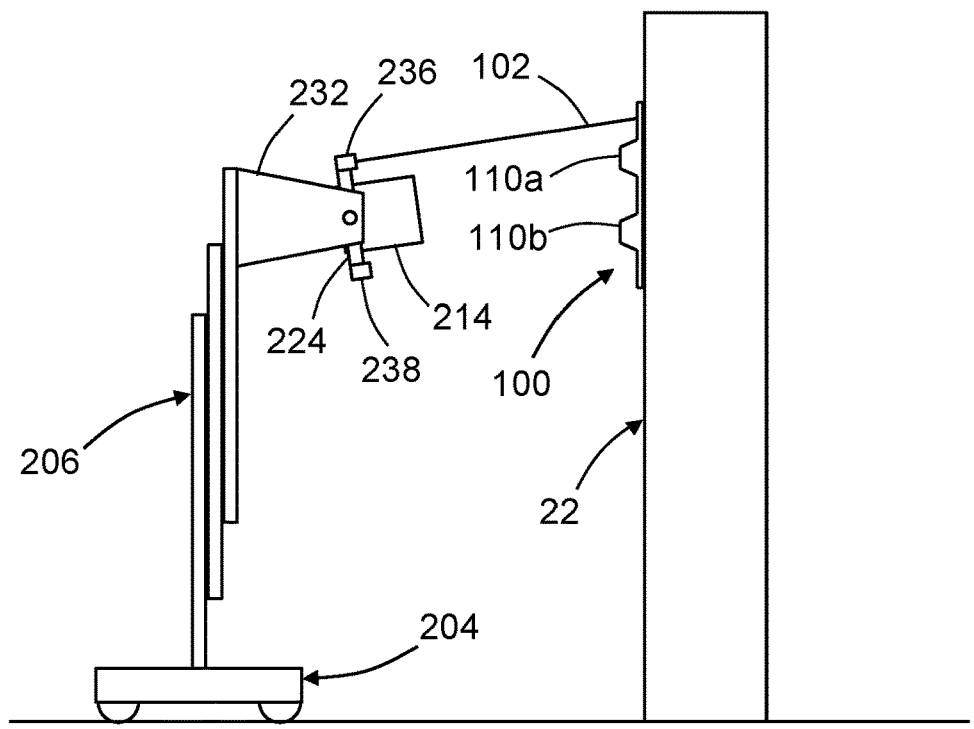
FIGS. 13A through 13E are diagrams representing respective side views of a structure comprising trapezoidal stringers attached to a skin being scanned at five different moments by a laser range meter onboard an automated NDI apparatus, which scans may be used to determine the surface profile of the stiffened structure.
Figure 13B:
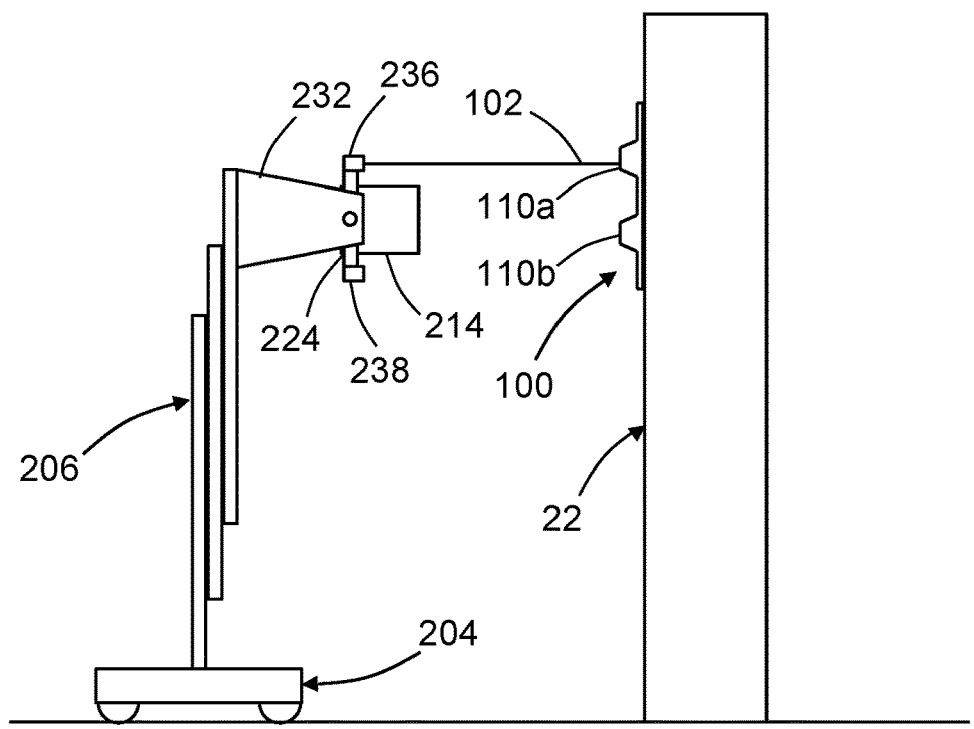
Figure 13C:
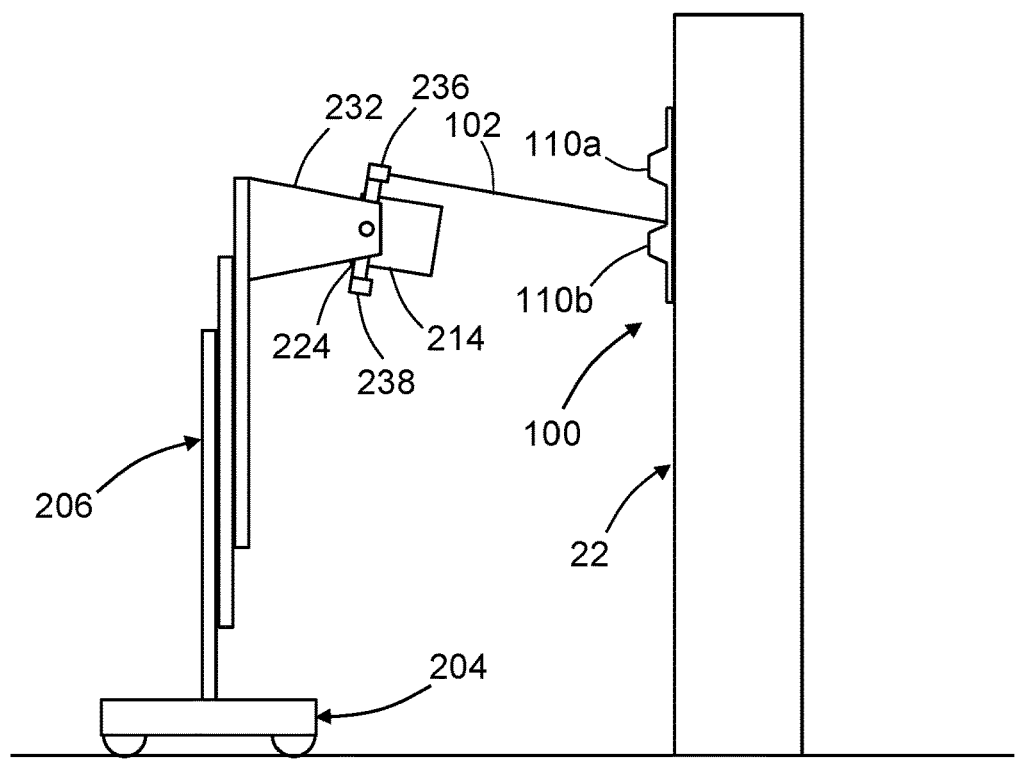
Figure 13D:
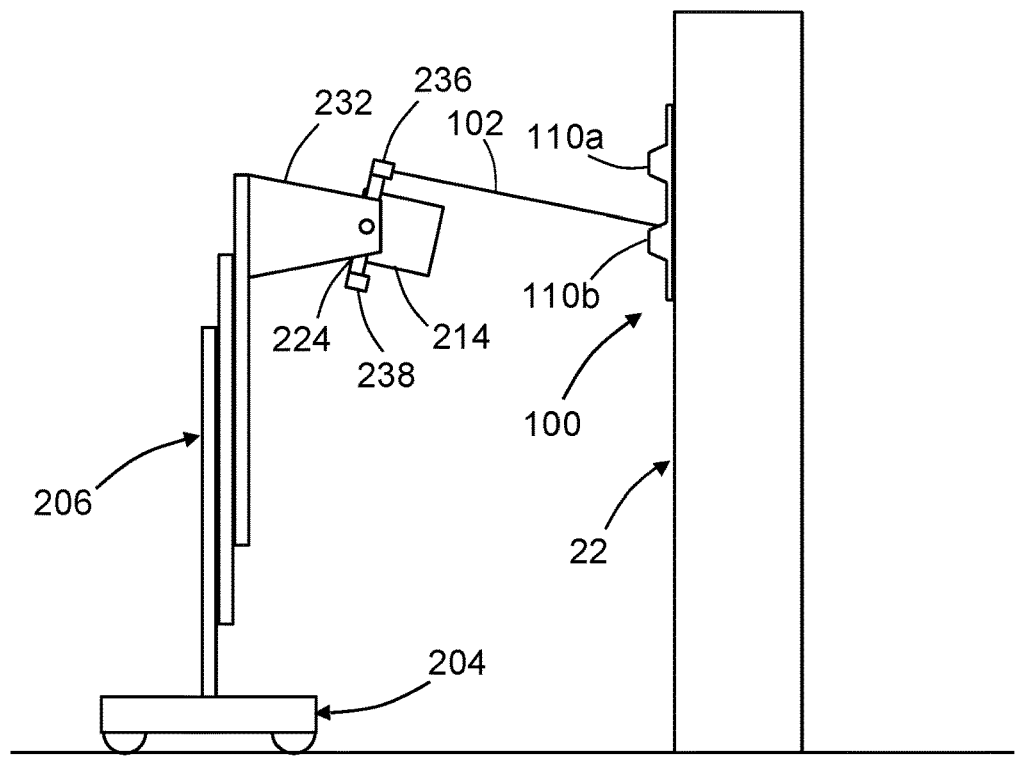
Figure 13E:
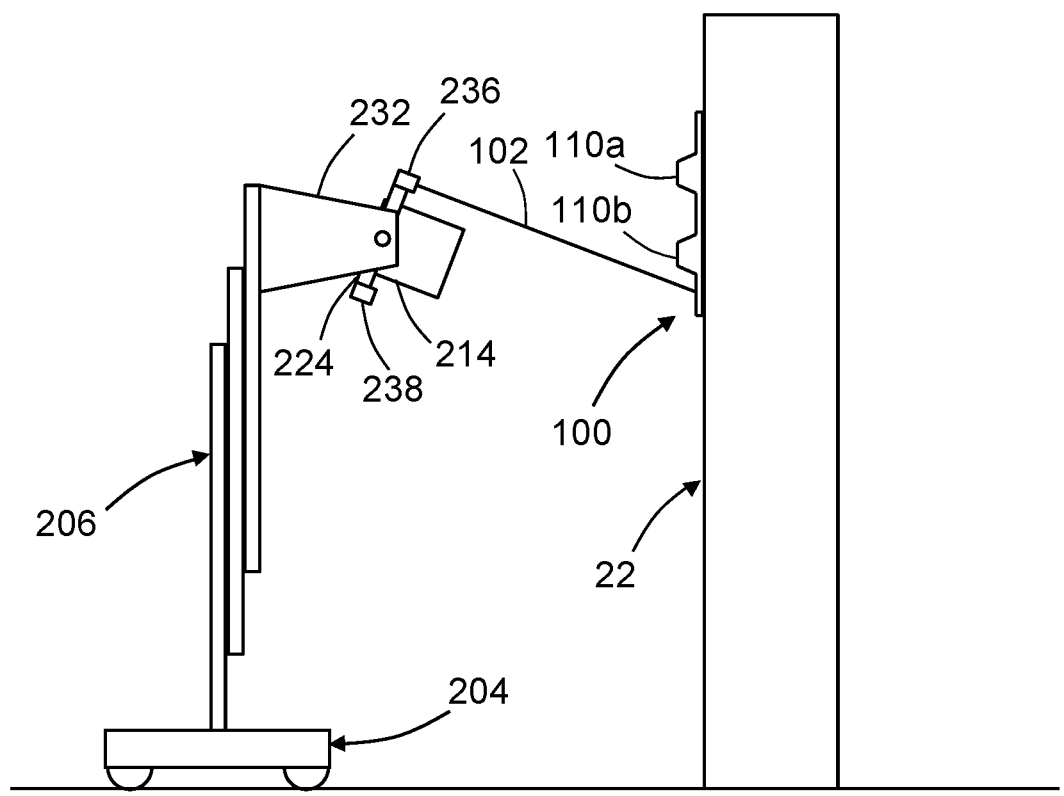

In the example depicted in FIGS. 13A-13E, laser range meter 236 is activated by a laser range meter control computer (hereinafter "LRM control computer 26", which is not shown in FIGS. 13A-13E, but is identified in FIG. 16) to emit a series of pulsed laser beams 102 while the end effector 224 is being rotated about a pitch axis. The end effector rotation causes the pulsed laser beams 102 to sweep across the non-planar surface of the trapezoidal stringers 110a and 110b in a plane that may be perpendicular to a major axis of the target object 22 (e.g., a fuselage or a wing panel). More specifically, FIG. 13A depicts a moment in time when the laser range meter 236 emits a pulsed laser beam 102 that impinges on the upper flange of trapezoidal stringer 110a; FIG. 13B depicts a moment in time when the laser range meter 236 emits a pulsed laser beam 102 that impinges on the cap of trapezoidal stringer 110a; FIG. 13C depicts a moment in time when the laser range meter 236 emits a pulsed laser beam 102 that impinges on the upper flange of trapezoidal stringer 110b; FIG. 13D depicts a moment in time when the laser range meter 236 emits a pulsed laser beam 102 that impinges on the upper angled side of trapezoidal stringer 110b; and FIG. 13E depicts a moment in time when the laser range meter 236 emits a pulsed laser beam 102 that impinges on the lower flange of trapezoidal stringer 110b.

Figure 14C:
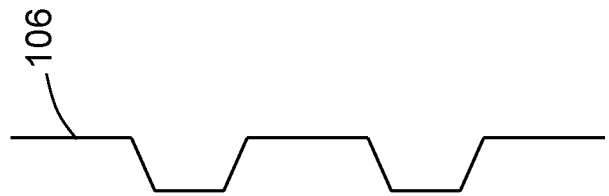
FIG. 14C is a diagram representing the surface profile resulting from the sweeping point scan of the structure depicted in FIG. 14A.
Figure 14B:
FIG. 14B is a diagram representing captured points on the structure depicted in FIG. 14A.
Figure 14A:
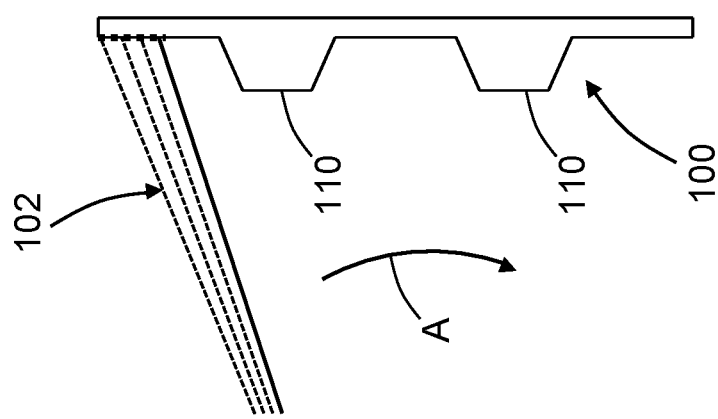
FIG. 14A is a diagram representing a portion of a sweeping point scan of a structure comprising trapezoidal stringers attached to a skin.

Although FIGS. 13A-13E show only five instances of a laser beam 102, it should be appreciated that hundreds (if not thousands) of pulsed laser beams may be emitted as the laser range meter sweeps from the top to the bottom of the plurality 100 of trapezoidal stringers. This sweeping point scan is depicted in FIG. 14A. The curved arrow A in FIG. 14A indicates a downward direction of sweeping. Obviously, the pulsed laser beams may be swept in the opposite direction, i.e., from bottom to top. At the start of the sweep, ideally the laser beam would be pointed at an angle such that the laser beam is initially outside of the desired profile scan area and is then swept into the target area. This procedure ensures that no portion of the desired profile scan area is missed.

After each emitted laser beam, the reflected light is detected by the laser range meter 236. The laser range meter 236 is configured to convert the time of emission and time of arrival to determine the time of flight. That time-of-flight information is in turn converted into the distance from the laser range meter 236 to the point of impingement. (The captured points of impingement are indicated by dots in FIG. 14A.) The typical off-the-shelf laser range meter is programmed to derive the distance from the time of flight using the index of refraction of ambient air. The distance data acquired by the laser range meter 236 is output to the LRM control computer 26 (identified in FIG. 16). Although in the example depicted in FIGS. 13A-13E, the laser range meter 236 is used to acquire distance data, any one or more of the three laser range meters 236, 238 and 240 may be used.

The LRM control computer 26 (see FIG. 16) receives the distance data from the laser range meter 236 and location data from the robot motion controller 80. The location data represents the respective locations (e.g., the same position but different orientations) of the laser range meter 236 in the frame of reference of the robotic NDI mobile platform for each captured point 104 (see FIG. 14B). The LRM control computer 26 (or a different computer in communication with the LRM control computer 26) is configured to correlate the distance and location data for each captured point and then calculate the coordinates of each captured point in the frame of reference of the robotic NDI mobile platform.

Using the coordinates of the captured points, the LRM control computer 26 (or a different computer in communication with the LRM control computer 26) is further configured to generate data representing a cross-sectional surface profile 106 (depicted in FIG. 14C) of the trapezoidal stringers. More specifically, LRM control computer 26 uses a line-fitting technique to create line segments that fit the captured points of laser beam impingement on the surfaces of the trapezoidal stringers 110a and 110b. These line segments represent regions of the surface profile 106 (each line segment including at least a preset number of points). The location of each line segment in the frame of reference of the robotic NDI mobile platform is stored in a non-transitory tangible computer-readable storage medium (e.g., random access memory) inside the LRM control computer 26.

Using the data representing the locations of the line segments, the LRM control computer 26 (or a different computer in communication with the LRM control computer 26) is further configured to generate a motion plan for the robotic NDI mobile platform that is calculated to aim the IRT scanner 214 at one or more surfaces of the trapezoidal stringers 110a and 110b for the acquisition of each IRT image. That motion plan is then loaded into the robot motion controller 80. Following loading of the motion plane, the robotic NDI mobile platform may be activated by an operator to conduct an automated inspection of the trapezoidal stringers 110a and 110b, which automated procedure includes movements dictated by the motion plan. The robot motion controller 80 then issues motor control signals that have the effect of positioning and orienting the end effector 224 in an initial location dictated by the motion plan. These movements may include one or more of the following: moving the holonomic-motion base 204 to a new location; extending or retracting the vertical extendible mast 206; and pivoting the end effector 224 about a pitch axis. While the end effector 224 is at the initial location, the IRT scanner is activated to capture (i.e., acquire) an IRT image of a first portion of the non-planar surface. Then the end effector 224 is moved to the next location dictated by the motion plan and another IRT image of a second portion of the non-planar surface is captured. The steps of locating the end effector and then capturing an IRT image of a respective portion of the non-planar surface are repeated until the automated IRT image acquisition sequence has been completed.

Figure 15A:
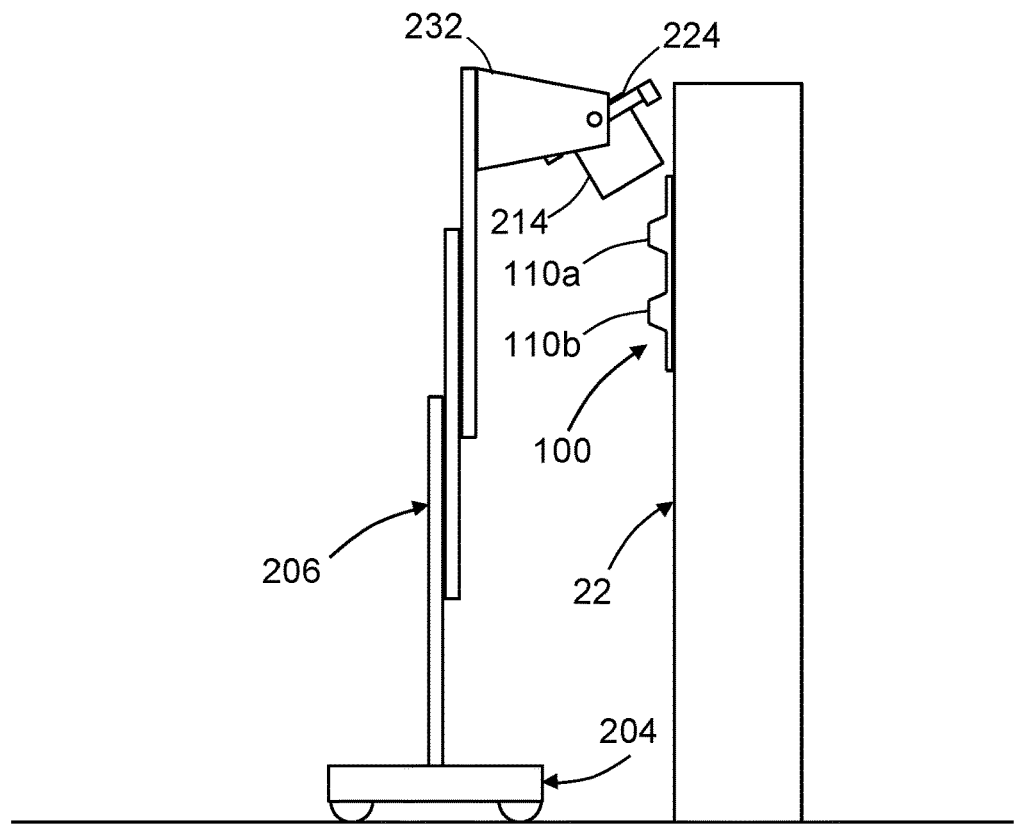
FIGS. 15A through 15E are diagrams representing respective side views of the structure depicted in FIGS. 12A-12E being sequentially inspected from different viewpoints using automated IRT image acquisition.
Figure 15B:
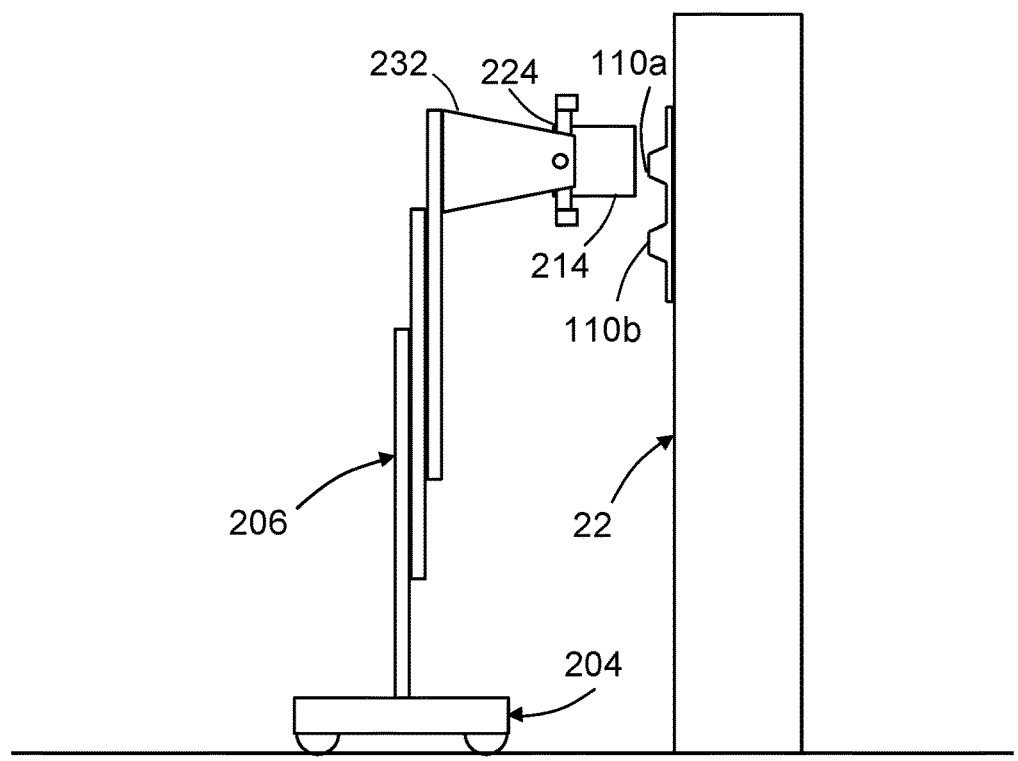
Figure 15C:
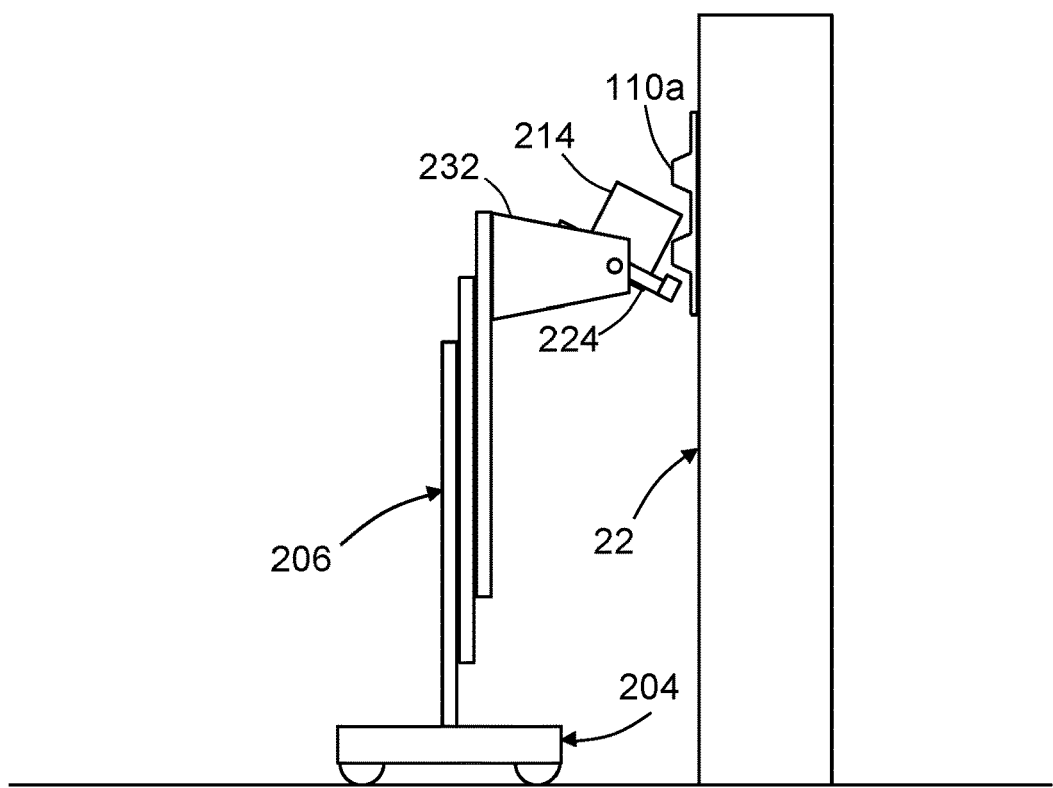
Figure 15D:
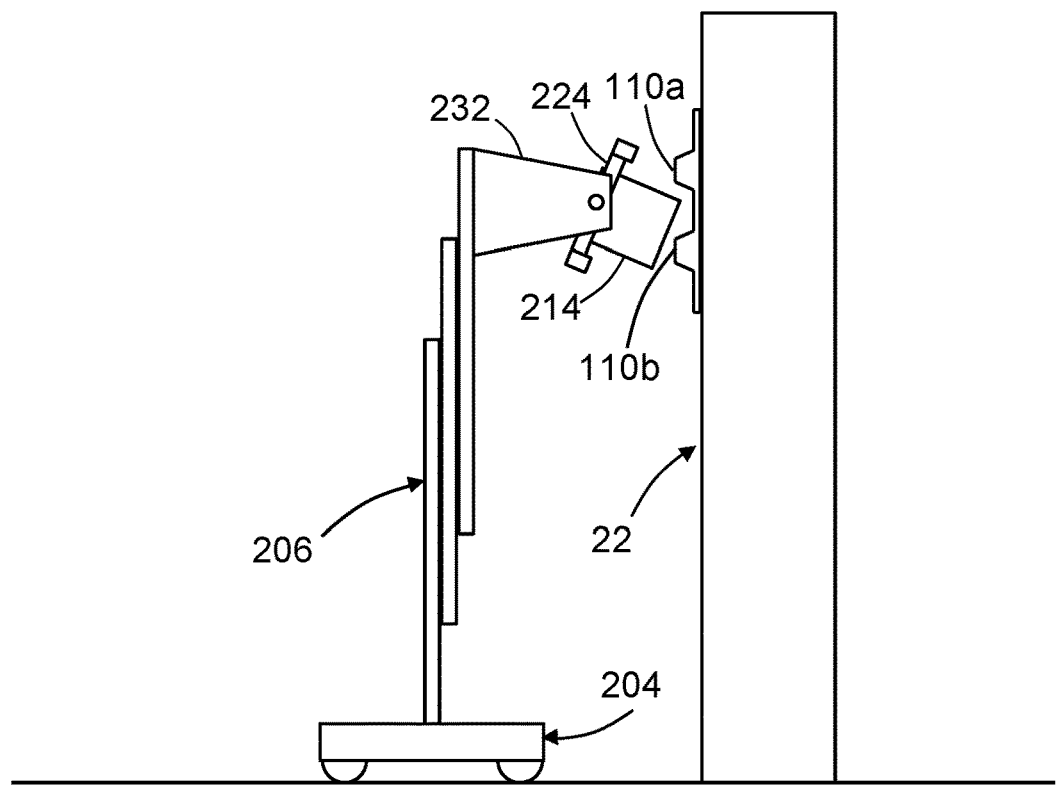
Figure 15E:
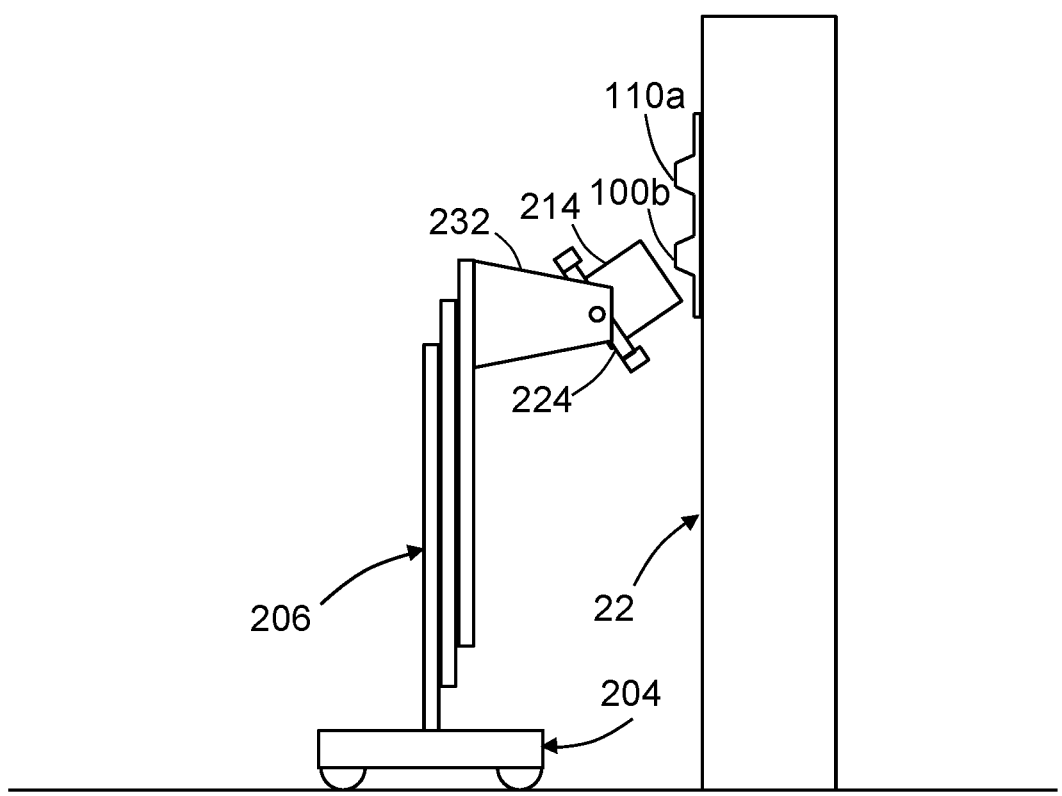

FIGS. 15A through 15E are diagrams representing respective side views of the trapezoidal stringers 110a and 110b being sequentially inspected from different viewpoints using automated IRT image acquisition. FIGS. 15A-15C show respective locations of the IRT scanner 214 during the acquisition of IRT images of trapezoidal stringer 110a from three different vantage points. The IRT image captured in FIG. 15A includes infrared imaging data acquired from the upper angled side of trapezoidal stringer 110a; the IRT image captured in FIG. 15B includes infrared imaging data acquired from the cap of trapezoidal stringer 110a; and the IRT image captured in FIG. 15C includes infrared imaging data acquired from the lower angled side of trapezoidal stringer 110a. FIGS. 15D and 15E show respective locations of the IRT scanner 214 during the acquisition of IRT images of trapezoidal stringer 110b from two different vantage points. The IRT image captured in FIG. 15D includes infrared imaging data acquired from both the upper angled side and the cap of trapezoidal stringer 110b; and the IRT image captured in FIG. 15E includes infrared imaging data acquired from the lower angled side and the cap of trapezoidal stringer 110b.

Preferably during the IRT image acquisition sequence depicted in FIGS. 15A-15E, the holonomic-motion base 204 is not moved in a lateral direction (parallel to the trapezoidal stringers 110a and 110b) and is not rotated about the yaw axis. As a result, the images captured in one scan sequence will be vertically aligned. Upon completion of each vertical scan sequence, the holonomic-motion base 204 is moved in the lateral direction by a distance that may be equal to (or slightly less than to enable adjacent images to overlap to facilitate stitching) the width of the surface area within the field of view of the infrared camera. After each such lateral movement, automated surface profile scanning and automated IRT image acquisition are repeated until the entire lengths of the trapezoidal stringers 110a and 110b have been inspected. If the trapezoidal stringers 110a and 110b are not straight due to curvature of the structure to which the trapezoidal stringers 110a and 110b are joined, then movement of the holonomic-motion base 204 in the interval between the most recent vertical scan sequence and the next surface profile scan may include displacement in a direction perpendicular to the lateral direction and/or rotation about the yaw axis.

FIG. 16 is a block diagram identifying some components of a system for infrared thermographic inspection of a composite structure having a non-planar surface in accordance with one computer architecture. Movements of the holonomic-motion base 204, vertically extendible mast 206 and pivotable end effector 224 are driven by respective motors 20 (the motor controllers are not shown, but see motor controllers 18 in FIG. 9). The motors 20 are controlled by the robot motion controller 80 based on the particular surface profile-dependent motion plan generated for each vertical scan sequence. The robot motion controller 80 is configured to receive feedback from sensors (incorporated in motors 20 or strategically placed with respect to the moving components), which sensor feedback includes data representing the magnitude of the extension of the vertically extendible mast 206 and the pitch angle of the end effector 224. The robot motion controller 80 (or a different computer in communication with the robot motion controller 80, such as the expert workstation 70) then converts that sensor feedback data into the Cartesian coordinates (in the frame of reference of the holonomic-motion base 204) and pitch angle of the laser range meter 236. That information is sent to the LRM control computer 26.

Firing of the laser range meter 236 is controlled by the LRM control computer 26, which also receives distance data (a.k.a. range data) from the laser range meter 236. The LRM control computer 26 (or a different computer in communication with the LRM control computer 26, such as the expert workstation 70) is configured to convert the distance data from the laser range meter 236 and the Cartesian coordinates and pitch angle of the laser range meter 236 from the robot motion controller 80 into the Cartesian coordinates of the point on the surface where the laser beam impinged.

As previously described, the LRM control computer 26 (or a different computer in communication with the LRM control computer 26, such as the expert workstation 70) is further configured to generate data representing a cross-sectional surface profile of the trapezoidal stringers. More specifically, LRM control computer 26 uses a line-fitting technique to create line segments that fit the captured points of laser beam impingement on the surfaces of the trapezoidal stringers. Using the data representing the locations of the line segments, the LRM control computer 26 (or a different computer in communication with the LRM control computer 26, such as the expert workstation 70) is further configured to generate a motion plan. That motion plan is then loaded into the robot motion controller 80. When the system is activated by an operator to perform an automated IRT inspection, the robot motion controller 80 causes the holonomic-motion base 204, vertically extendible mast 206 and pivotable end effector 224 (to which the laser range meter 236 is mounted) to move in accordance with the motion plan.

Still referring to FIG. 16, activation of the infrared camera 4 and flash lamps 6 are controlled by an infrared thermography computer 8, which also receives infrared imaging data from the infrared camera 4. The infrared thermography computer 8, LRM control computer 26 and robot motion controller 80 may be in wireline or wireless communication with a master computer at the expert workstation 70. The master computer at the expert workstation 70 may be programmed to correlate the end effector location data with the infrared imaging data. The master computer may be further programmed to request 3-D model data from a 3-D model database server 72. In the case of thermographic porosity measurement, the master computer at the expert workstation 70 may also be programmed to request reference thermal signature data from a reference thermal signature database server 74.

Optionally, the location of the end effector in the frame of reference of the target object at the time of image acquisition may be determined using known techniques. In the case of a barrel-shaped fuselage section, the infrared imaging data can then be mapped directly onto a 3-D model of the fuselage section. The overlay of infrared imaging data with the 3-D model data enables improved data analysis and potential automated data analysis as well. For example, features/flaw indications can be directly correlated to the fuselage structure by direct overlay of infrared imaging data on the 3-D model. In addition, the direct data overlay onto the model can be used to determine the thickness of a local area or spatial point, which is needed for porosity quantification. In one embodiment, the process involves application of infrared imaging data strips as one or more computer graphics texture maps, which are projected onto the 3-D model surfaces in a virtual environment displayed on a monitor or computer screen at the expert workstation 70.

The above-described concepts provide a method to automatically adapt IRT inspection to various surface shapes, such as hat stringers having flat or rounded caps. The process involves a sweeping motion of a laser range meter 236 to continuously capture distance and angle data, which is then converted into Cartesian coordinates that describe the surface profile of the target object 22 in a vertical plane. Then the acquired surface profile data is processed by a computer to generate a motion plan for automatically guiding the end effector 224 to the correct locations where IRT images of the area of interest may be captured. The IRT scanner 214 may be positioned and oriented to acquire IRT images of the surfaces of each trapezoidal stringer 110, thereby enabling the detection of any anomalies in the angled sides, cap, flanges or corners of each trapezoidal stringer 110.

With additional rule-based information on the acceptable side angle aiming requirements for imaging trapezoidal stringers 110, it is possible to use the laser profile data to determine if one, two or three separate images of each trapezoidal stringer 110 are needed, and then automatically instruct the system to make the necessary position and orientation adjustments as the profile of the trapezoidal stringers 110 changes from one scan region to the next along the length of the target object 22. This also works for objects in which the profile is unknown. This technology provides the ability to automatically adapt to variable shapes on the surface of the target object 22 using a single infrared camera 4.

Figure 17A:
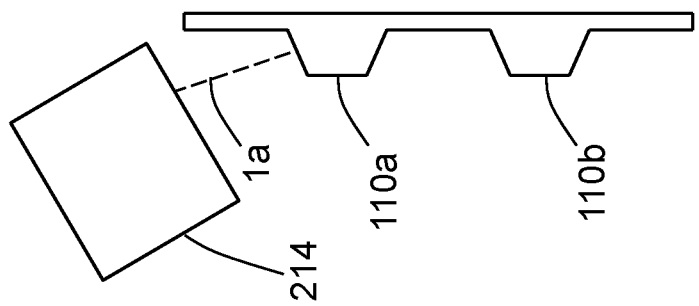
FIGS. 17A through 17C are diagrams representing magnified views of respective portions of FIGS. 15A through 15C with the addition of vectors (indicated by dashed lines) normal to the surfaces being inspected.
Figure 17B:
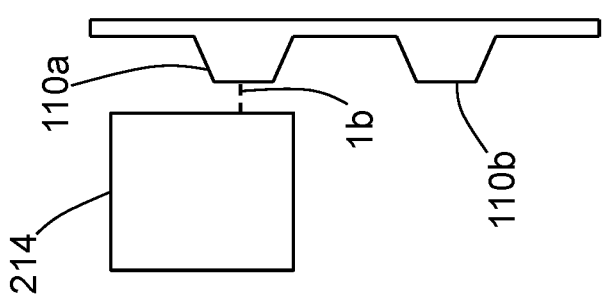
Figure 17C:
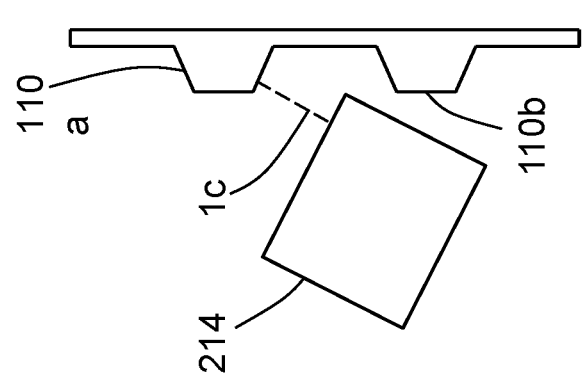

In accordance with one IRT image acquisition sequence for an individual trapezoidal stringer 110, three IRT images are captured as follows: (1) a first IRT image of one angled side of the trapezoidal stringer 110 is captured while the focal axis of the infrared camera is parallel to or within N degrees of being parallel to (where N is an integer having a user-selectable value) a vector $1a$ (see FIG. 17A) which is normal to the surface of the one angled side of the trapezoidal stringer 110; (2) a second IRT image of the cap of the trapezoidal stringer 110 is captured while the focal axis of the infrared camera is parallel to or within N degrees of being parallel to a vector $1b$ (see FIG. 17B) which is normal to the surface of the cap of the trapezoidal stringer 110; and (3) a third IRT image of the other angled side of the trapezoidal stringer 110 is captured while the focal axis of the infrared camera is parallel to or within N degrees of being parallel to a vector 1c (see FIG. 17C) which is normal to the surface of the other angled side of the trapezoidal stringer 110.

Figure 18B:
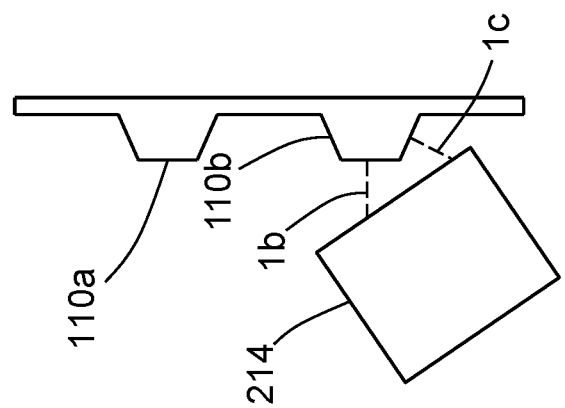
FIGS. 18A and 18B are diagrams representing magnified views of respective portions of FIGS. 15D and 15E with the addition of vectors (indicated by dashed lines) normal to the surfaces being inspected.
Figure 18A:
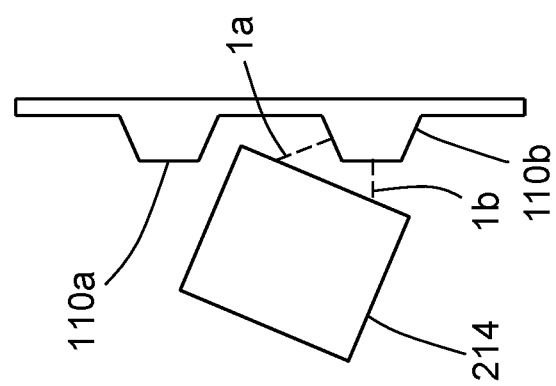

In accordance with another IRT image acquisition sequence for an individual trapezoidal stringer 110, two IRT images are captured as follows: (1) a first IRT image of one angled side and the cap of the trapezoidal stringer 110 is captured while the focal axis of the infrared camera is aligned with a first aim direction vector that is an average of the normals to the surfaces of the one angled side and the cap (see FIG. 18A); and (2) a second IRT image of the cap and the other angled side of the trapezoidal stringer 110 is captured while the focal axis of the infrared camera is aligned with a second aim direction vector that is an average of the normals to the surfaces of the other angled side and the cap (see FIG. 18B).

Figure 19:
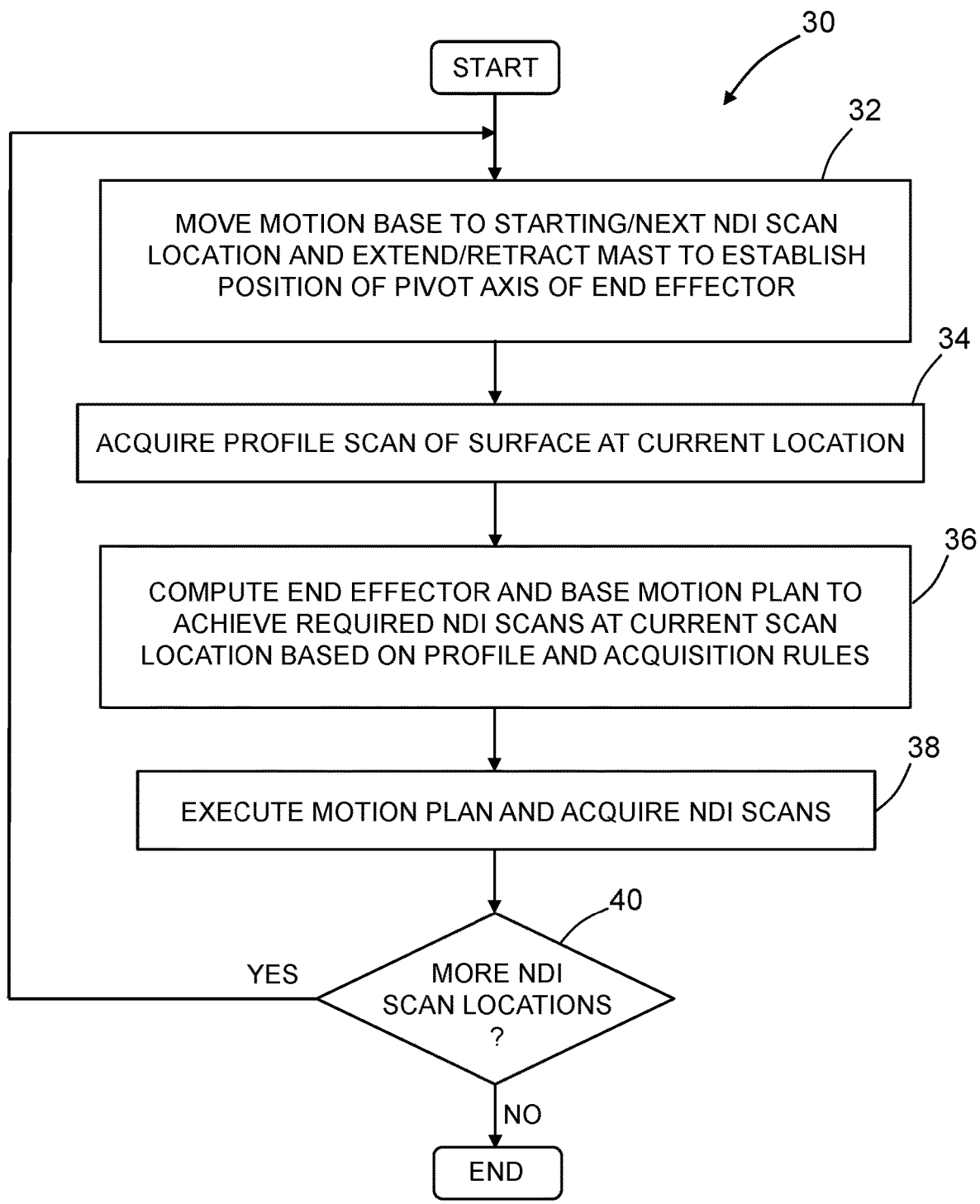
FIG. 19 is a flowchart identifying steps of a method for non-destructive inspection of a non-planar surface using location alignment feedback.

FIG. 19 is a flowchart identifying some steps of a method 30 for non-destructive inspection of a non-planar surface using location alignment feedback as depicted in FIGS. 17A-17C, 18A and 18B. The method 30 includes the following steps: (a) the holonomic-motion base 204 is moved to the starting or next NDI scan location and the mast 206 is extended or retracted until the pitch axis of the end effector 224 is at a desired position (step 32); (b) while the pitch axis of the end effector 224 is at the desired position, the end effector 224 is rotated about the pitch axis and the laser range meter 236 (attached to the end effector 224) is activated to acquire a profile scan of the surface at the current NDI scan location (step 34); (c) a computer then generates an end effector and base motion plan to achieve desired NDI scans at the current NDI scan location based on the profile of the swept surface and image acquisition rules (step 36); (d) the motion plan is executed and the planned NDI scan sequence for the current NDI scan location are acquired (step 38) by alternating camera movement and image capture (while the camera is stationary); and (e) upon completion of the image acquisition sequence at the current NDI scan location, a determination is made whether images need to be acquired at additional NDI scan locations (step 40). On the one hand, if a determination is made in step 40 that the holonomic-motion base 204 should be moved to the next NDI scan location, the process returns to step 32. On the other hand, if a determination is made in step 40 that no additional NDI scans are needed, the process is terminated.

Figure 20:
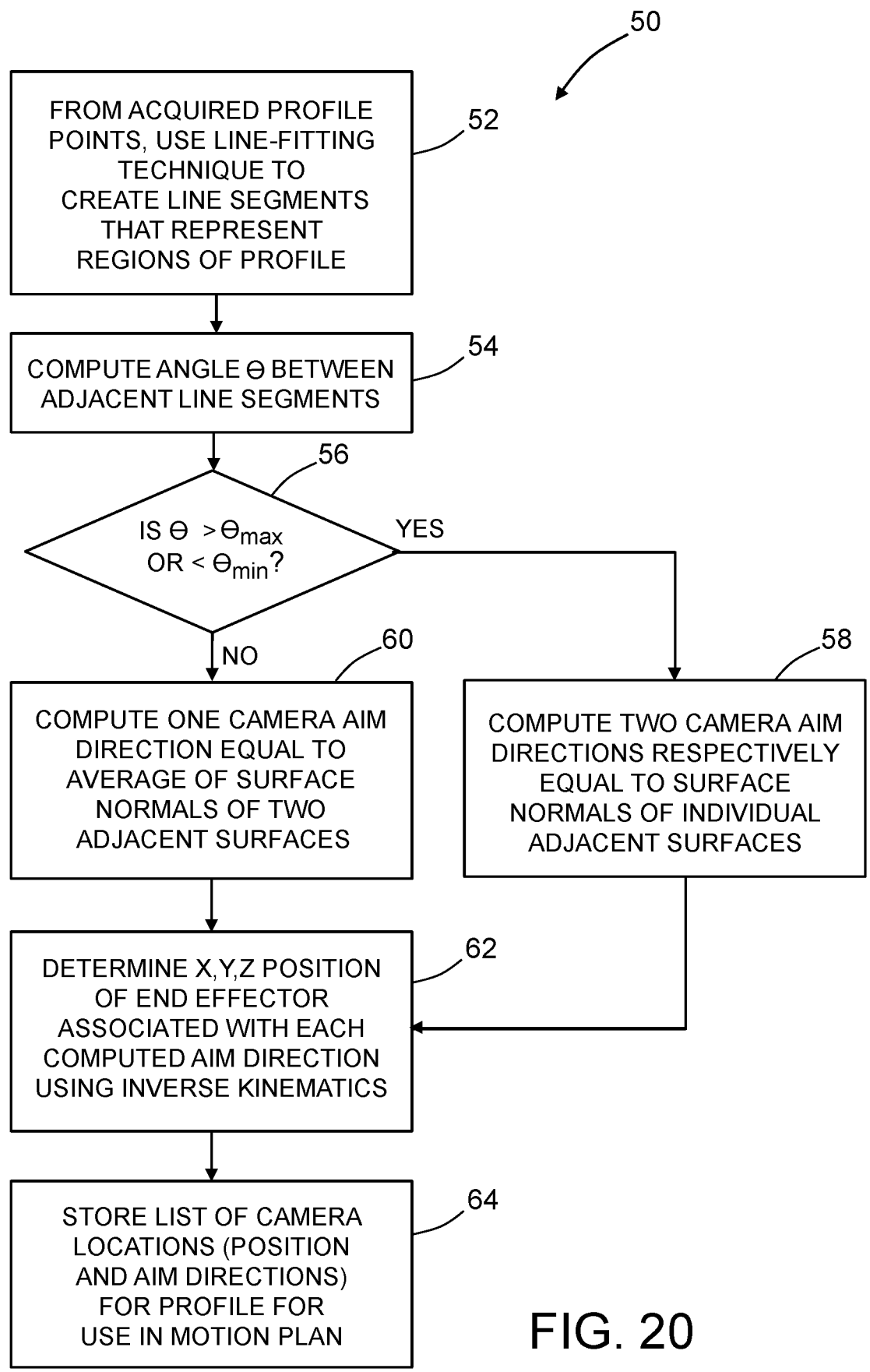
FIG. 20 is a flowchart identifying steps of an algorithm for computing an end effector and base motion plan for NDI scanning a vertical section of a non-planar surface based on the measured surface profile and acquisition rules.

FIG. 20 is a flowchart identifying steps of an algorithm 50 for computing an end effector and base motion plan for NDI scanning a vertical section of a non-planar surface based on the measured surface profile and acquisition rules in accordance with one proposed implementation of step 36 in FIG. 19. The algorithm 50 may be executed by the LRM control computer 26 or a different computer in communication with the LRM control computer 26, such as the expert workstation 70 (see FIG. 16).

Referring to FIG. 20, a line-fitting technique is used to create line segments that fit the captured points of laser beam impingement on the surfaces of the trapezoidal stringers (step 52). Each line segment including at least a preset number of points. These line segments represent regions of the surface profile 106 seen in FIG. 14C. The location of each line segment (in the frame of reference of the robotic NDI mobile platform) is stored in a non-transitory tangible computer-readable storage medium. For example, a location of a line segment may be defined by the coordinates of the two endpoints of the line segment. Using the data representing the locations of the line segments, the computer then computes the respective external angle $\theta$ formed by each pair of adjacent (and connected) line segments (step 54). For each computed external angle $\theta$ greater than 180 degrees, the computer determines whether the computed angle $\theta$ is greater than a maximum allowable angle $\theta_{max}$ for image capture or less than a minimum allowable angle $\theta_{min}$ for image capture (step 56). This is accomplished by comparing each computed external angle $\theta$ to the maximum and minimum allowable angles, which may be selected by a user during pre-inspection set-up of the system.

On the one hand, if a determination is made in step 56 that the computed external angle is not greater than the maximum allowable angle and not less than the minimum allowable angle, then the computer computes a camera aim direction (i.e., an angle of the focal axis of the infrared camera 4) that will be used to enable the infrared camera 4 to capture a single image of both of the adjacent surfaces that intersect at the computed external angle, which computed camera aim direction is an average of the two vectors which are respectively normal (see, e.g., normal vectors 1a and 1b in FIG. 18A) to those adjacent surfaces (step 60). On the other hand, if a determination is made in step 56 that the computed external angle is greater than the maximum allowable angle or less than the minimum allowable angle, then the computer computes a pair of camera aim directions that will be used to enable the infrared camera 4 to capture individual images of the adjacent surfaces that intersect at the computed angle, which computed camera aim directions are respectively parallel to or within N degrees of being parallel to the two vectors which are respectively normal (see, e.g., normal vectors 1a and 1b in FIGS. 17A and 17B) to those adjacent surfaces (step 58).

Figure 21A:
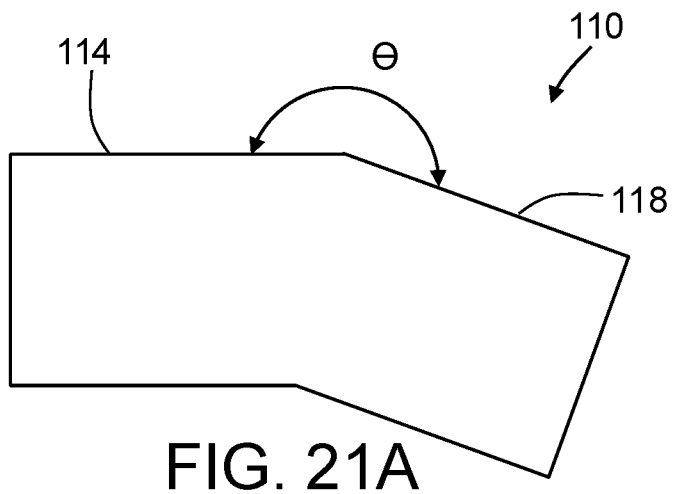
FIG. 21A is a diagram representing a convex corner formed by an intersection of two planar surfaces having an external angle θ which is greater than 180 degrees.
Figure 21B:
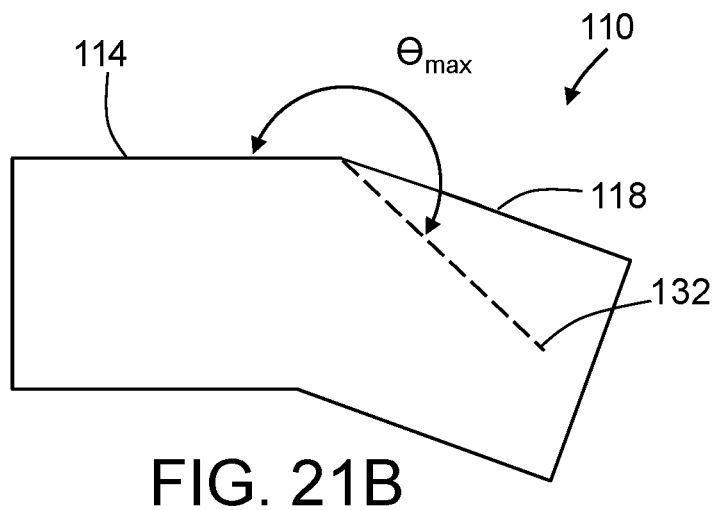
FIG. 21B is a diagram representing a convex corner formed by an intersection of two planar surfaces having an external angle θ which is greater than 180 degrees and less than a maximum allowable angle $\theta_{max}$.

FIG. 21A is a diagram representing a convex corner formed by an intersection of two planar surfaces of an angled side 118 and a cap 114 of a trapezoidal stringer 110. In this example, the intersection has an external angle $\theta$ which is greater than 180 degrees. FIG. 21B is a diagram representing a convex corner formed by an intersection of the same two planar surfaces having the same external angle $\theta$, but with a dashed line 132 added to indicate a maximum allowable angle $\theta_{max}$. In this example, the external angle $\theta$ is not greater than the maximum allowable angle $\theta_{max}$, so the computer will compute a single camera aim direction for capturing a single image that includes portions of both planar surfaces, for example, at an angle that is the average of the two vectors normal to the respective surfaces of the cap 114 and angled side 118.

Figure 21C:
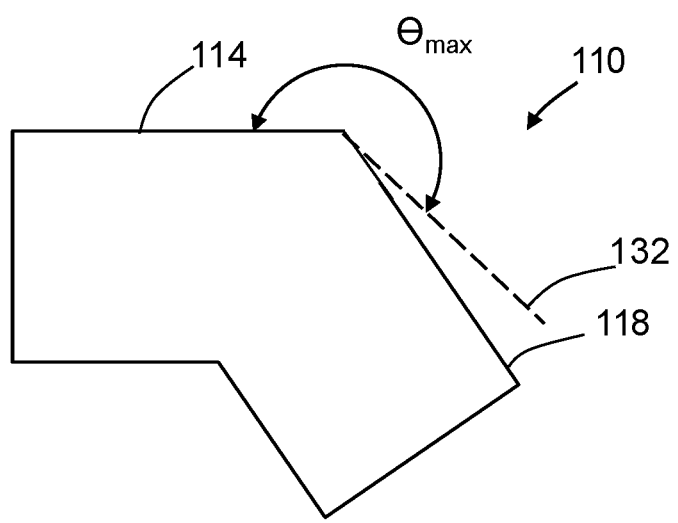
FIG. 21C is a diagram representing a convex corner formed by an intersection of two planar surfaces having an external angle θ which is greater than 180 degrees and greater than a maximum allowable angle $\theta_{max}$.

FIG. 21C is a diagram representing a convex corner formed by an intersection of two planar surfaces of an angled side 118 and a cap 114 of a trapezoidal stringer 110. In this example, the intersection has an external angle $\theta$ which is greater than the maximum allowable angle $\theta_{max}$. In this instance, the computer will compute two camera aim directions for capturing separate images of the two individual planar surfaces.

Figure 22A:
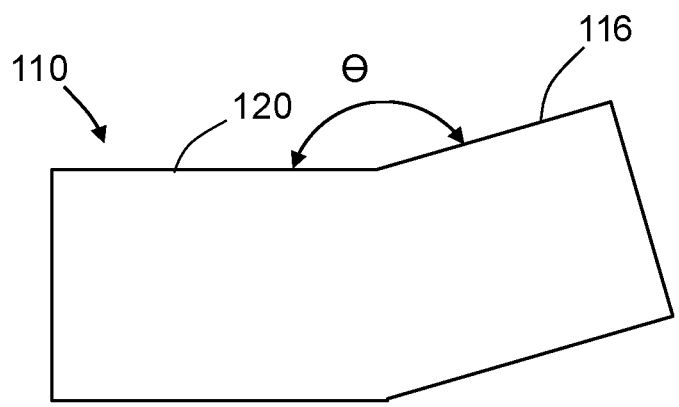
FIG. 22A is a diagram representing a concave corner formed by an intersection of two planar surfaces having an external angle θ which is less than 180 degrees.
Figure 22B:
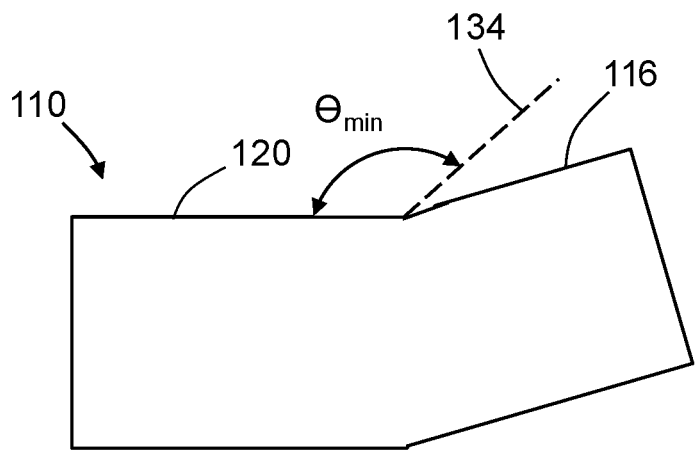
FIG. 22B is a diagram representing a concave corner formed by an intersection of two planar surfaces having an external angle θ which is less than 180 degrees and greater than a minimum allowable angle $\theta_{min}$.

FIG. 22A is a diagram representing a concave corner formed by an intersection of two planar surfaces of an angled side 116 and a flange 120 of a trapezoidal stringer 110. In this example, the intersection has an external angle $\theta$ which is less than 180 degrees. FIG. 22B is a diagram representing a concave corner formed by an intersection of the same two planar surfaces having the same external angle $\theta$, but with a dashed line 134 added to indicate a minimum allowable angle $\theta_{min}$. In this example, the external angle $\theta$ is not less than the minimum allowable angle $\theta_{min}$, so the computer will compute a single camera aim direction for capturing a single image that includes portions of both planar surfaces, for example, at an angle that is the average of the two surface normal of surfaces 116 and 120.

Figure 22C:
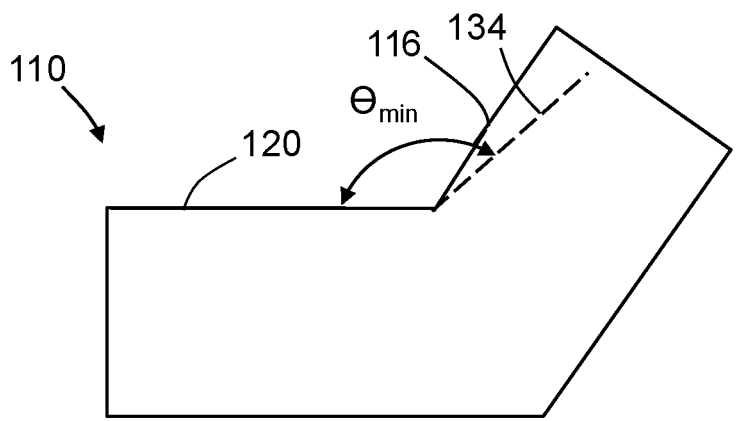
FIG. 22C is a diagram representing a concave corner formed by an intersection of two planar surfaces having an external angle θ which is less than 180 degrees and less than a minimum allowable angle $\theta_{min}$. Reference will hereinafter be made to the drawings in which similar elements in different drawings bear the same reference numerals.

FIG. 22C is a diagram representing a concave corner formed by an intersection of two planar surfaces of an angled side 116 and a flange 120 of a trapezoidal stringer 110. In this example, the intersection has an external angle θ which is less than the minimum allowable angle $θ_{min}$. In this instance, the computer will compute two camera aim directions for capturing separate images of the two individual planar surfaces.

Following computation of the camera aim directions, the computer determines (i.e., computes) the x,y,z coordinates (in the frame of reference of the robotic NDI mobile platform) of a respective position of the pitch axis of the end effector 224 and the pitch angle of the end effector 224 associated with each computed camera aim direction using inverse kinematics in well-known manner (step 62). In some situations there can be more than one solution provided by an inverse kinematics calculation for a position and orientation goal, depending on the geometry and joint limits of the arm. If it does happen that there is more than one solution, the usual approach is to choose the one that is the closest or does not require movement past a joint limit on the way to the other solution.

In accordance with one proposed implementation, the computer is configured to include in its computations the fact that the distance d of the infrared camera 4 from surface to be imaged should be kept relatively constant from one IR image to the next IR image. For example, the x,y,z coordinates for the position of a center point of the end effector 224 and the pitch angle of the end effector 224 may be computed such that: (1) the focal axis of the infrared camera 4 is collinear with the computed camera aim direction; and (2) the distance d measured from the lens of the infrared camera 4 to the surface to be imaged lies in a range $(d-\Delta d)<d<(d+\Delta d)$, where $\Delta d$ is a user-selectable allowable variance in the distance d.

The computed coordinate position of the pitch axis of the end effector 224 and the computed pitch angle of the end effector 224 are stored (step 64 in FIG. 20) in a non-transitory tangible computer-readable storage medium (e.g., random access memory in the computer that is performing the above-described computations) for use in generating the motion plan. Since the infrared camera 4 is affixed to the end effector 224 with its focal axis normal to a plane of the end effector 224 that intersects the pitch axis of the end effector 224, the camera aim direction is dictated by and a function of the computed pitch angle of the end effector 224, while the location of the camera lens is dictated by and a function of the computed coordinate position of the pitch axis.

As previously described with reference to FIGS. 15A-15C, the motion plan for the robotic NDI mobile platform is calculated to aim the IRT scanner 214 at one or more surfaces of the trapezoidal stringers 110a and 110b for the acquisition of each IRT image. That motion plan is then loaded into the robot motion controller 80. The robot motion controller 80 issues motor control signals that are calculated to move the holonomic-motion base 204 and end effector 224 to each image acquisition location in accordance with the motion plan. In between successive movements, the holonomic-motion base 204 and end effector 224 are maintained in a motionless state as each IRT image is acquired.

Although the concepts disclosed herein have application for holonomic-motion bases, variations are also applicable to other systems. Potential use cases include: holonomic- and non-holonomic-motion platforms; articulated robotic arms; gantry arms; and hybrid motion-base/arm systems.

In accordance with one generalized description of a method for non-destructive inspection of a non-planar surface applicable to various types of automated apparatus, the method comprises: moving an end effector to a first position in proximity to the non-planar surface with a first orientation at which a distance sensor attached to the end effector is directed toward the non-planar surface; acquiring distance data for a multiplicity of points on the non-planar surface during a sweep of the distance sensor; generating surface profile data representing a surface profile of the non-planar surface from the distance data acquired; calculating a second position and a second orientation of the end effector using the surface profile data; moving the end effector to the second position and rotating the end effector to the second orientation; and performing a non-destructive inspection of a first portion of the non-planar surface while the end effector is stationary at the second position with the second orientation using a non-destructive inspection sensor attached to the end effector. The multiplicity of points lie in a plane that intersects the non-planar surface. This method may further comprise: using the surface profile data to calculate a third position and a third orientation of the end effector; moving the end effector to the third position and rotating the end effector to the third orientation; and performing a non-destructive inspection of a second portion of the non-planar surface while the end effector is stationary at the third position with the third orientation using the non-destructive inspection sensor.

In accordance with one generalized description of a method for non-destructive inspection of a non-planar surface applicable to various types of automated apparatus, the method comprises: moving a base of an end effector-carrying mobile platform to a location on a ground or floor in proximity to a structure having a non-planar surface; moving an end effector to an initial position in proximity to the non-planar surface with an initial orientation at which a distance sensor attached to the end effector is directed toward the non-planar surface; acquiring distance data for a multiplicity of points on the non-planar surface that lie in a plane that intersects the non-planar surface during a sweep of the distance sensor; generating surface profile data representing a surface profile of the non-planar surface from the distance data acquired; generating a motion plan for the end effector based on the initial position and initial orientation of the end effector and the surface profile; alternatingly moving the end effector to and stopping the end effector at a series of locations in accordance with the motion plan; and performing a respective non-destructive inspection of a respective portion of the non-planar surface at each of the series of locations while the end effector is not moving using a non-destructive inspection sensor attached to the end effector. The surface profile data includes coordinate data representing locations of first and second line segments that intersect at an angle not equal to 180 degrees.

In accordance with some embodiments of the method described in the preceding paragraph: (a) the step of generating surface profile data comprises using a line-fitting technique to create first and second line segments that fit first and second sets of points that are included in the multiplicity of points; and (b) the step of generating a motion plan for the end effector comprises: calculating an angle between the first and second line segments; determining whether the calculated angle is greater than a maximum allowable angle or not; and calculating one or two non-destructive inspection sensor aim directions in dependence on the results of determining whether the calculated angle is greater than a maximum allowable angle or or less than a minimum allowable angle or neither. The step of calculating one or two non-destructive inspection sensor aim directions comprises: calculating a first direction of a vector normal to the first line segment; and calculating a second direction of a vector normal to the second line segment. More specifically, calculating one or two non-destructive inspection sensor aim directions comprises calculating one non-destructive inspection sensor aim direction that is parallel to an average of the first and second directions in response to a determination that the calculated angle is not greater than the maximum allowable angle and not less than the minimum allowable angle, or selecting a first non-destructive inspection sensor aim direction that is closer to being parallel with the first direction than being parallel to the second direction and selecting a second non-destructive inspection sensor aim direction that is closer to being parallel with the second direction than being parallel to the first direction in response to a determination that the calculated angle is greater than the maximum allowable angle or less than the minimum allowable angle.

The method described in the preceding two paragraphs may be performed by a system for non-destructive inspection of a non-planar surface, including: a robotic non-destructive inspection mobile platform comprising a pivotable end effector, a distance sensor (e.g., a laser range meter) affixed to the end effector, a non-destructive inspection sensor (e.g., an infrared camera) affixed to the end effector, and motors for moving the end effector; and a computer system configured to perform the following operations: (a) controlling the motors to cause the end effector to rotate about a pivot axis; (b) activating the distance sensor to acquire distance data for a multiplicity of points on a non-planar surface of a structure to be inspected that lie in a plane that intersects the non-planar surface during rotation of the end effector; (c) receiving the distance data from the distance sensor; (d) generating surface profile data representing a surface profile of the non-planar surface from the distance data received; (e) calculating a starting position and a starting orientation of the end effector using the surface profile data; (f) controlling the motors to move the end effector to the starting position and rotate the end effector to the starting orientation; and (g) activating the non-destructive sensor to perform a non-destructive inspection of a portion of the non-planar surface while the end effector is stationary at the starting position with the second orientation.

In real-world applications, it is possible that the shapes of structures (such as trapezoidal stringers incorporated in aircraft components) may vary in profile from one end to the other. The system and method disclosed above enable the location of the infrared camera position to be adapted by taking into account the variability of the stringer surface profiles in a lengthwise direction of the stiffened structure.

While systems and methods for non-destructive inspection of structures having non-planar surfaces have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The embodiments disclosed above use one or more computers that may be part of a computer system. As used in the claims, the term "computer system" comprises a single processing or computing device or multiple processing or computing devices that communicate via wired or wireless connections. Such processing or computing devices typically include one or more of the following: a processor, a controller, a central processing unit, a microcontroller, a reduced instruction set computer processor, an application-specific integrated circuit, a programmable logic circuit, a field-programmable gated array, a digital signal processor, and/or any other circuit or processing device capable of executing the functions described herein.

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

As used in the claims, the term "location" comprises position in a three-dimensional coordinate system and orientation relative to that coordinate system. As used in the claims, the term "moving an end effector" should be construed broadly to include at least one or more of the following: moving an end effector relative to a robotic arm that is movably coupled to a base; moving the robotic arm relative to the base; and moving the base relative to ground.

The invention claimed is:

1. A method for non-destructive inspection of a non-planar surface, comprising:
    moving an end effector to a first position in proximity to the non-planar surface with a first orientation at which a distance sensor attached to the end effector is directed toward the non-planar surface;
    acquiring distance data for a multiplicity of points on the non-planar surface during a sweep of the distance sensor;
    generating surface profile data representing a surface profile of the non-planar surface from the distance data acquired;
    calculating a second position and a second orientation of the end effector using the surface profile data;
    moving the end effector to the second position and rotating the end effector to the second orientation; and
    performing a non-destructive inspection of a first portion of the non-planar surface while the end effector is stationary at the second position with the second orientation using a non-destructive inspection sensor attached to the end effector.

2. The method as recited in claim 1, wherein the multiplicity of points lie in a plane that intersects the non-planar surface.

3. The method as recited in claim 1, wherein the first portion of the non-planar surface comprises first and second planar surfaces that form an angle not equal to 180 degrees.

4. The method as recited in claim 1, wherein the distance sensor is a laser range meter.

5. The method as recited in claim 1, wherein the non-destructive inspection sensor is an infrared camera.

6. The method as recited in claim 1, wherein the non-planar surface is formed by surfaces of one or more stringers.

7. The method as recited in claim 1, further comprising:
using the surface profile data to calculate a third position and a third orientation of the end effector;
moving the end effector to the third position and rotating the end effector to the third orientation; and
performing a non-destructive inspection of a second portion of the non-planar surface while the end effector is stationary at the third position with the third orientation using the non-destructive inspection sensor.

8. The method as recited in claim 7, wherein the first and second portions of the non-planar surface are respective planar surfaces that form an angle not equal to 180 degrees.

9. The method as recited in claim 1, wherein the surface profile data includes coordinate data representing locations of first and second line segments that intersect at an angle not equal to 180 degrees.

10. The method as recited in claim 9, wherein generating surface profile data comprises using a line-fitting technique to create first and second line segments that fit first and second sets of points that are included in the multiplicity of points.

11. The method as recited in claim 10, wherein calculating the second position and the second orientation of the end effector comprises:
calculating an angle between the first and second line segments;
determining whether the calculated angle is greater than a maximum allowable angle or less than a minimum allowable angle or neither; and
calculating one or two non-destructive inspection sensor aim directions in dependence on result of determining whether the calculated angle is greater than the maximum allowable angle or less than the minimum allowable angle or neither.

12. The method as recited in claim 11, wherein calculating one or two non-destructive inspection sensor aim directions comprises:
calculating a first direction of a vector normal to the first line segment; and
calculating a second direction of a vector normal to the second line segment.

13. The method as recited in claim 12, wherein calculating one or two non-destructive inspection sensor aim directions comprises calculating one non-destructive inspection sensor aim direction that is parallel to an average of the first and second directions in response to a determination that the calculated angle is greater than the maximum allowable angle or less than the minimum allowable angle.

14. The method as recited in claim 12, wherein calculating one or two non-destructive inspection sensor aim directions comprises selecting a first non-destructive inspection sensor aim direction that is closer to being parallel with the first direction than being parallel to the second direction and selecting a second non-destructive inspection sensor aim direction that is closer to being parallel with the second direction than being parallel to the first direction in response to a determination that the calculated angle is not greater than the maximum allowable angle and not less than the minimum allowable angle.

15. A method for non-destructive inspection of a non-planar surface, comprising:
moving a base of an end effector-carrying mobile platform to a location on a ground or floor in proximity to a structure having a non-planar surface;
moving an end effector to an initial position in proximity to the non-planar surface with an initial orientation at which a distance sensor attached to the end effector is directed toward the non-planar surface;
acquiring distance data for a multiplicity of points on the non-planar surface during a sweep of the distance sensor in a plane that intersects the non-planar surface;
generating surface profile data representing a surface profile of the non-planar surface from the distance data acquired;
generating a motion plan for the end effector based on the initial position and initial orientation of the end effector and the surface profile;
alternatingly moving the end effector to and stopping the end effector at a series of locations in accordance with the motion plan; and
performing a respective non-destructive inspection of a respective portion of the non-planar surface at each of the series of locations while the end effector is not moving using a non-destructive inspection sensor attached to the end effector.

16. The method as recited in claim 15, wherein the distance sensor is a laser range meter, the non-destructive inspection sensor is an infrared camera, and the non-planar surface of the structure is formed by surfaces of one or more stringers.

17. The method as recited in claim 15, wherein the surface profile data includes coordinate data representing locations of first and second line segments that intersect at an angle not equal to 180 degrees.

18. The method as recited in claim 17, wherein generating surface profile data comprises using a line-fitting technique to create first and second line segments that fit first and second sets of points that are included in the multiplicity of points.

19. The method as recited in claim 18, wherein generating a motion plan for the end effector comprises:
calculating an angle between the first and second line segments;
determining whether the calculated angle is greater than a maximum allowable angle or less than a minimum allowable angle or neither; and
calculating one or two non-destructive inspection sensor aim directions in dependence on result of determining whether the calculated angle is greater than a maximum allowable angle or less than a minimum allowable angle or neither.

20. The method as recited in claim 19, wherein calculating one or two non-destructive inspection sensor aim directions comprises:
calculating a first direction of a vector normal to the first line segment; and
calculating a second direction of a vector normal to the second line segment.

21. The method as recited in claim 20, wherein calculating one or two non-destructive inspection sensor aim directions comprises calculating one non-destructive inspection sensor aim direction that is parallel to an average of the first and second directions in response to a determination that the calculated angle is not greater than the maximum allowable angle and not less than the minimum allowable angle.

22. The method as recited in claim 20, wherein calculating one or two non-destructive inspection sensor aim directions comprises selecting a first non-destructive inspection sensor aim direction that is closer to being parallel with the first direction than being parallel to the second direction and selecting a second non-destructive inspection sensor aim direction that is closer to being parallel with the second direction than being parallel to the first direction in response to a determination that the calculated angle is greater than the maximum allowable angle or less than the minimum allowable angle.

23. A system for non-destructive inspection of a non-planar surface, comprising:
   a robotic non-destructive inspection mobile platform comprising a pivotable end effector, a distance sensor affixed to the end effector, a non-destructive inspection sensor affixed to the end effector, and motors for moving the end effector; and
   a computer system configured to perform the following operations:
   controlling the motors to cause the end effector to rotate about a pivot axis;
   activating the distance sensor to acquire distance data for a multiplicity of points on a non-planar surface of a structure to be inspected that lie in a plane that intersects the non-planar surface during rotation of the end effector;
   receiving the distance data from the distance sensor;
   generating surface profile data representing a surface profile of the non-planar surface from the distance data received;
   calculating a starting position and a starting orientation of the end effector using the surface profile data;
   controlling the motors to move the end effector to the starting position and rotate the end effector to the starting orientation; and
   activating the non-destructive sensor to perform a non-destructive inspection of a portion of the non-planar surface while the end effector is stationary at the starting position with the starting orientation.

24. The system as recited in claim 23, wherein the distance sensor is a laser range meter and the non-destructive inspection sensor is an infrared camera.

* * * * *